US012384161B2

(12) United States Patent
Nakamura et al.

(10) Patent No.: US 12,384,161 B2
(45) Date of Patent: Aug. 12, 2025

(54) LIQUID DISCHARGE APPARATUS

(71) Applicant: SEIKO EPSON CORPORATION, Tokyo (JP)

(72) Inventors: Hiroyuki Nakamura, Shiojiri (JP); Satoshi Inomata, Matsumoto (JP); Akihiro Toya, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 260 days.

(21) Appl. No.: 18/173,694

(22) Filed: Feb. 23, 2023

(65) Prior Publication Data

US 2023/0271421 A1 Aug. 31, 2023

(30) Foreign Application Priority Data

Feb. 25, 2022 (JP) ................................ 2022-028221

(51) Int. Cl.
*B41J 2/175* (2006.01)

(52) U.S. Cl.
CPC ....... *B41J 2/17513* (2013.01); *B41J 2/17523* (2013.01); *B41J 2/17596* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17596; B41J 29/13; B41J 2002/17516
See application file for complete search history.

(56) References Cited

U.S. PATENT DOCUMENTS 6,629,758 B2 * 10/2003 Okamoto ............ B41J 2/17596 347/85
6,916,088 B2 * 7/2005 Smith ................. B41J 2/17523 347/86
2009/0027469 A1 * 1/2009 Furukawa ........... B41J 2/17563 347/93
2016/0271955 A1 9/2016 Ono et al.

FOREIGN PATENT DOCUMENTS

JP 2016-175277 A 10/2016
JP 2016-175279 A 10/2016

* cited by examiner

*Primary Examiner* — Anh T Vo
(74) *Attorney, Agent, or Firm* — WORKMAN NYDEGGER

(57) ABSTRACT

A liquid discharge apparatus includes a liquid discharge head configured to discharge liquid. The liquid discharge apparatus includes a reservoir configured to store liquid to be supplied to the liquid discharge head. The reservoir is provided at a position lower than the liquid discharge head. The liquid discharge apparatus includes a supply flow path configured to communicate with the liquid discharge head and the reservoir. The supply flow path is provided with a joint detachable from the liquid discharge head. The liquid discharge apparatus includes a retainer configured to retain the joint detached from the liquid discharge head. The joint has a coupler to be coupled to the liquid discharge head. The retainer is configured to retain the joint with the coupler facing up.

12 Claims, 8 Drawing Sheets

LIQUID DISCHARGE APPARATUS

The present application is based on, and claims priority from JP Application Serial Number 2022-028221, filed Feb. 25, 2022, the disclosure of which is hereby incorporated by reference herein in its entirety.

BACKGROUND

1. Technical Field

The present disclosure relates to a liquid discharge apparatus including a liquid discharge head that discharges liquid supplied from a reservoir in which liquid is stored.

2. Related Art

JP-A-2016-175279 discloses an ink jet printer as an example of a liquid discharge apparatus including a liquid discharge head that discharges liquid such as ink. This kind of liquid discharge apparatus includes a reservoir to store liquid. The reservoir and the liquid discharge head are coupled via a supply flow path. The liquid discharge head performs printing on a medium by discharging the liquid supplied from the reservoir through the supply flow path.

In the liquid discharge apparatus described in JP-A-2016-175279, the liquid discharge head is replaceable. The liquid discharge apparatus includes a joint at the leading end of the supply flow path extending from the reservoir. A coupler of the joint is detachably coupled to a female coupler provided in the liquid discharge head. When the liquid discharge head is replaced, the joint is detached from the liquid discharge head.

However, in the liquid discharge apparatus described in JP-A-2016-175279, the supply flow path is retained by a retainer with the coupler of the joint detached from the liquid discharge head facing in a horizontal direction. For this reason, liquid such as ink may drip from the coupler of the joint. The dripping of liquid may contaminate the components in the body of the liquid discharge apparatus and located below the joint. Note that when the liquid in the reservoir is emptied once, the dripping of liquid from the joint may be prevented, but extra work of emptying the reservoir is necessary.

SUMMARY

A liquid discharge apparatus to solve the above-mentioned problem includes: a liquid discharge head configured to discharge liquid; a reservoir provided at a position lower than the liquid discharge head, and configured to store liquid to be supplied to the liquid discharge head; a supply flow path provided with a joint detachable from the liquid discharge head, and configured to communicate with the liquid discharge head and the reservoir; and a retainer configured to retain the joint detached from the liquid discharge head. The joint has a coupler to be coupled to the liquid discharge head, and the retainer is configured to retain the joint with the coupler facing up.

DESCRIPTION OF EXEMPLARY EMBODIMENTS

First Embodiment

Figure 1:
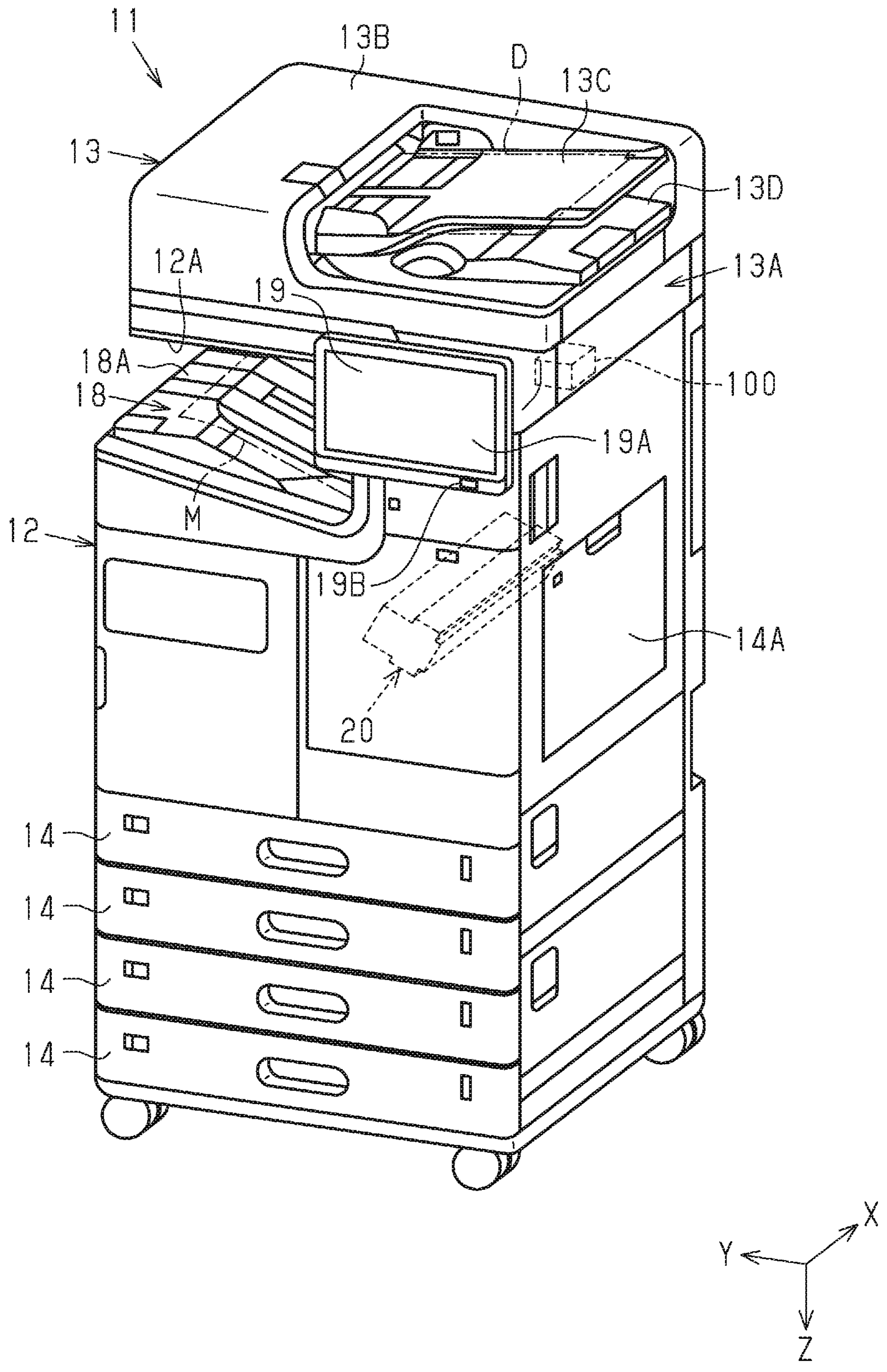
FIG. 1 is a perspective view illustrating a liquid discharge apparatus in a first embodiment.

Hereinafter a first embodiment of a liquid discharge apparatus will be described with reference to the drawings. The liquid discharge apparatus is, for example, an ink jet printer that performs printing by discharging ink, which is an example liquid, on a medium such as a sheet of paper.

In the drawings, a liquid discharge apparatus 11 is assumed to be placed on a horizontal surface, and the direction of gravity is indicated by the Z-axis, and the direction along the horizontal surface is indicated by the X-axis and the Y-axis. The X-axis, the Y-axis, and the Z-axis are perpendicular to each other. The X-axis indicates the depth direction of the liquid discharge apparatus 11, and the Y-axis indicates the width direction of the liquid discharge apparatus 11. The direction parallel to the X-axis is also the width direction of a medium M, thus may be referred to as the width direction X.

Entire Configuration of Liquid Discharge Apparatus

As illustrated in FIG. 1, the liquid discharge apparatus 11 is, for example, a multifunction printer. The liquid discharge apparatus 11 includes an apparatus body 12 in a cuboid shape. The apparatus body 12 forms an ink jet printer. In this example in which the liquid discharge apparatus 11 is a multifunction printer, an image reader 13 is provided above the apparatus body 12.

The image reader 13 includes a reader 13A that reads a document D, and an automatic document feeder 13B that feeds the document D. The automatic document feeder 13B feeds a document D placed on a document tray 13C to the reader 13A, and discharges the document D read by the reader 13A to a discharge tray 13D. In addition, the image reader 13 also has a flatbed reading function of the reader 13A of reading a document D set on a platen which is exposed when the automatic document feeder 13B also serving as a platen cover is opened.

The liquid discharge apparatus 11 may include a media storage 14 that can store a plurality of media M. The media storage 14 is, for example, a cassette. In this situation, the media storage 14 is provided as one drawer or several drawers (for example, four drawers in FIG. 1). When the media storage 14 is a cassette, it is inserted below the apparatus body 12 by sliding in the X direction in a state where the media storage 14 is detachable. In a plurality of media storages 14, for example, media M having different sizes or types are stored. Note that in addition to or in replacement of the media storage 14, as a media supply unit, the liquid discharge apparatus 11 may include a media placement unit 14A, such as a paper feed tray, on which media M can be placed.

As illustrated in FIG. 1, the apparatus body 12 has a liquid discharge head 20 that can discharge liquid. The liquid discharge head 20 prints an image on a medium M by discharging ink as an example of liquid to the medium M fed from the media storage 14. In the apparatus body 12, liquid storages 82 (see FIG. 2) are housed, which store ink as an example of liquid. The liquid discharge head 20 performs printing on the medium M using the liquid such as ink supplied from the liquid storages 82. The liquid discharge apparatus 11 of this embodiment allows replacement of the liquid discharge head 20. The details of replacement work of the liquid discharge head 20 will be described later.

The liquid discharge apparatus 11 includes a stacker 18 that receives media M after printing. The liquid discharge apparatus 11 has a depressed section 12A between the apparatus body 12 and the image reader 13. The stacker 18 is comprised of the depressed section 12A, and a discharge tray 18A mounted on the bottom of the depressed section 12A. The discharge tray 18A is a member in a rectangular plate shape. In this embodiment, the discharge tray 18A is mounted in a state where it is detachable from the apparatus body 12. A medium M after printing discharged from the apparatus body 12 into the depressed section 12A is placed on the upper surface (placement surface) of the discharge tray 18A. The discharge tray 18A is inclined by a predetermined angle in a direction in which a downstream position in a discharge direction in which a printed medium M is discharged is higher than an upstream position.

The liquid discharge apparatus 11 may have a display unit 19 in the apparatus body 12. The display unit 19 is comprised of, for example, a touch panel. A touch operation function of the display unit 19 may serve as an operation section 19A. A user can give instructions to the liquid discharge apparatus 11 by operating the operation section 19A. In addition, the liquid discharge apparatus 11 includes a power button 19B which is operated to turn on/off a power supply. Note that the operation section 19A may be an operation button provided separately from the display unit 19.

The liquid discharge apparatus 11 includes a controller 100 that is responsible for the control of the entire apparatus. The controller 100 performs a plurality of types of control including print control to control a printing mechanism including the liquid discharge head 20, read control to control the image reader 13, and display control to control the display unit 19. The controller 100 includes a computer which is not illustrated. The computer is configured to include a central processing unit (CPU), and a memory which are not illustrated. The CPU is an arithmetic processing unit. The memory is a storage device that ensures an area to store the program of the CPU or a work area, and has a memory device and a storage, such as a random access memory (RAM), and an electrically erasable programmable read-only memory (EEPROM). The CPU controls the operation of the components of the liquid discharge apparatus 11 in accordance with the program stored in the memory.

In the liquid discharge apparatus 11 of this embodiment, the liquid discharge head 20 can be replaced by an operator such as a serviceman or a user. An operator selects a service mode by operating the operation section 19A on a menu screen displayed on the display unit 19, and further selects head replacement.

When receiving input of a signal indicating the service mode, the controller 100 shifts from the print mode to the service mode. When receiving head replacement instructions in the service mode, the controller 100 causes the liquid discharge head 20 to move from the current position (for example, a cap position) to a replacement position PH2 (see FIG. 3) below the discharge tray 18A. The liquid discharge head 20 can be detached from the apparatus body 12 by an operator detaching the discharge tray 18A. After the liquid discharge head 20 is moved to the replacement position PH2, an operator may operate the power button 19B to achieve a power OFF state, and may perform head replacement work in the power OFF state. In addition, an operator may detach the liquid discharge head 20 from the apparatus body 12 for the purpose of maintenance or investigation of a cause of a failure.

Internal Configuration of Liquid Discharge Apparatus 11

Figure 2:
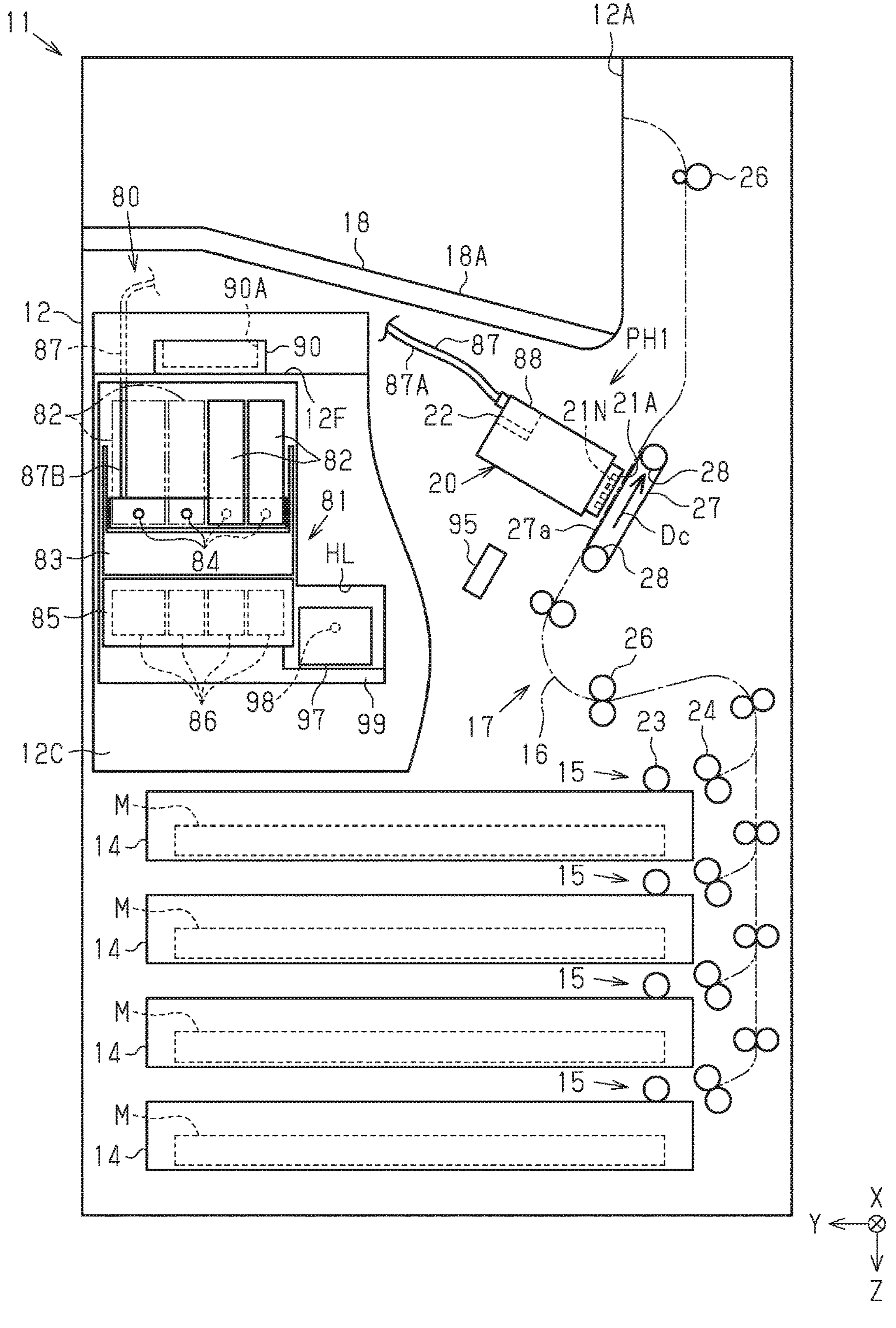
FIG. 2 is a schematic front cross-sectional view illustrating the internal configuration of the liquid discharge apparatus.

Next, the internal configuration of the liquid discharge apparatus 11 will be described with reference to FIG. 2. As illustrated in FIG. 2, the media storage 14 can store a plurality of media M in a stacked state. The liquid discharge apparatus 11 includes a feeder 15 that feeds a medium M from the media storage 14, and a transporter 17 that transports a medium M along a transport path 16 indicated by a dashed-dotted line in FIG. 2. The transport path 16 is a path connecting the media storage 14 and the stacker 18.

The feeder 15 may include a feed roller 23 that feeds a medium M stored in the media storage 14, and a separator 24 that separates the media M sheet by sheet. The feeder 15 delivers a medium M stored in the media storage 14 to the transport path 16.

The transporter 17 may include transport rollers 26, an endless-shaped transport belt 27, and a pair of rollers 28 around which the transport belt 27 is wound. The transporter 17 may include a plurality of transport rollers 26. The transport rollers 26 rotate with a medium M held therebetween, thereby transporting the medium M.

The transport belt 27 has a transport surface 27*a* for transporting the medium M. The transport surface 27*a* is a planar part of the outer peripheral surface of the transport belt 27 for supporting the medium M, for example, by electrostatic adsorption. The transport belt 27 may be provided so that the transport surface 27*a* is inclined to a horizontal plane. In this embodiment, the direction which is along the transport surface 27*a*, and in which the medium M is transported is referred to as a transport direction Dc. The transport belt 27 circumferentially rotates with the medium M supported by the transport surface 27*a*, thereby transporting the medium M in the transport direction Dc.

The liquid discharge head 20 has a nozzle surface 21A in which nozzles 21N for discharging liquid are opened. The liquid discharge head 20 discharges liquid through the nozzles 21N, thereby performing printing on the medium M supported by the transport surface 27*a* of the transport belt 27. The liquid discharge head 20 of this embodiment is a line type that can discharge liquid in the width direction X of the medium M. The liquid discharge head 20 is mounted so that the longitudinal direction of the liquid discharge head 20 matches the width direction X of the medium M.

As illustrated in FIG. 2, the liquid discharge apparatus 11 includes a liquid supply unit 80 that can supply liquid to the liquid discharge head 20. The liquid discharge apparatus 11 includes a frame 12C that stores the liquid discharge head 20 and the liquid supply unit 80. In the frame 12C, an opening HL is formed, which allows the liquid supply unit 80 to pass in the depth direction X.

The liquid supply unit 80 includes a liquid supply member 81, a supply flow path 87, and a joint 88 provided at the leading end of the supply flow path 87. The joint 88 is coupled to a female coupler 22 provided in the liquid discharge head 20.

The liquid supply member 81 includes a mounting section 83 on which the liquid storages 82 storing liquid are detachably mounted. The mounting section 83 has needle sections 84. Each liquid storage 82 mounted on the mounting section 83 can supply liquid by being inserted in a corresponding needle section 84. The liquid supply member 81 includes a supply mechanism 85 that can store the liquid supplied from the liquid storages 82 through the mounting section 83, and can supply the stored liquid to the liquid discharge head 20 through the supply flow path 87.

The liquid discharge apparatus 11 includes reservoirs 86 configured to store the liquid to be supplied to the liquid discharge head 20. The reservoirs 86 of this embodiment are provided in the supply mechanism 85, and store the liquid supplied from the liquid storages 82 through the mounting section 83. In this respect, the liquid storages 82 in this example stores the liquid to be supplied to the reservoirs 86.

Each reservoir 86 is provided at a position lower than the liquid discharge head 20. The liquid discharge head 20 in this example is configured to be movable along a movement path through a print position PH1 and a replacement position PH2 (see FIG. 3) which are different in height position in the vertical direction Z. In a state where the liquid discharge head 20 is at the print position PH1 which is the lowest position illustrated in FIG. 2 on the movement path, the position of the liquid level of the liquid in the reservoir 86 is lower than the position of the nozzle surface 21A of the liquid discharge head 20.

The liquid discharge apparatus 11 includes the supply flow path 87 configured to communicate with the liquid discharge head 20 and the reservoirs 86. The supply flow path 87 is provided with the joint 88 which is detachable from the liquid discharge head 20.

The supply flow path 87 is coupled to the supply mechanism 85 at one end, and is coupled to the joint 88 at the other end. The one end of the supply flow path 87 is coupled to the reservoirs 86 included in the supply mechanism 85. The reservoirs 86 are provided as many as the number of types of liquid discharged by the liquid discharge head 20.

The plurality of liquid storages 82 may store liquid which are different types from each other. The plurality of liquid storages 82 may store, for example, ink of different colors. For example, the plurality of liquid storages 82 store ink in cyan, magenta, yellow, black. The plurality of liquid storages 82 may have different amounts of stored liquid. For example, the liquid storage 82 that stores black ink may have a greater amount of stored liquid than any liquid storage 82 that stores ink of another color.

The liquid stored in the plurality of liquid storages 82 is individually supplied to the plurality of corresponding reservoirs 86 through the mounting section 83. Different types of liquid are stored in the plurality of reservoirs 86. The supply flow path 87 is provided for each of the types of liquid supplied from the plurality of reservoirs 86 to the liquid discharge head 20.

The supply flow path 87 is configured to have a variable section 87A which is deformable for a predetermined length from the joint 88. The supply flow path 87 may have a fixed section 87B in part of the extension from the reservoir 86 to the variable section 87A, the fixed section 87B being retained in a state unlikely to be deformed. The fixed section 87B of the supply flow path 87 is a communicating hole formed as a flow path in a flow path member made of a synthetic resin, or is comprised of a tube held by a guide member. The variable section 87A of the supply flow path 87 is formed of a material having flexibility, and is a flow path composed of, for example, a synthetic resin or rubber having elasticity. The variable section 87A of the supply flow path 87 is comprised of a tube, for example. Note that at least part of the supply flow path 87 may be a deformable variable section 87A, or the entirety thereof may be the variable section 87A. The variable section 87A is not limited to a tube having flexibility, and may be bellows or the like.

The female coupler 22, to which the joint 88 is detachably coupled, is fixed to the liquid discharge head 20. The joint 88 is coupled to the female coupler 22, thus the reservoir 86 and the liquid discharge head 20 are coupled to each other through the supply flow path 87.

Regarding the joint 88, a plurality of supply flow paths 87 may be collectively coupled to the liquid discharge head 20 by one joint 88. Alternatively, the joints 88 may be provided as many as the number of the supply flow paths 87. In the following, a description will be given using an example of a configuration in which one joint 88 collectively couples the plurality of supply flow paths 87 to the liquid discharge head 20.

As illustrated in FIG. 2, the liquid discharge apparatus 11 includes a retainer 90 that can retain the joint 88 detached from the liquid discharge head 20. The retainer 90 is located on the lower side of the discharge tray 18A. The retainer 90 is disposed at a position such that when the discharge tray 18A is detached for head replacement, the retainer 90 is exposed through an opening 12D. In the example illustrated in FIG. 2, the retainer 90 is fixed to the upper surface of a frame unit 12F having a horizontal surface disposed above an area in which the plurality of liquid storages 82 are disposed in the frame 12C. The configuration including the retainer 90 provided in the liquid discharge apparatus 11 for head replacement will be described later.

In the liquid supply member 81, part of the mounting section 83 and the supply flow path 87 is located rearward of the opening HL in the depth direction X. Thus, when viewing the opening HL from a position forward of the frame 12C, an operator can get a view of part of the reservoir 86 through the opening HL. The reservoir 86 has a window made of a transparent synthetic resin at the front in FIG. 2, and a user can visually check the remaining amount of liquid in the reservoir 86 through the window.

The liquid discharge apparatus 11 includes a maintenance unit 95 that performs maintenance of the liquid discharge head 20. In addition, the liquid discharge apparatus 11 includes a waste liquid storage 97 that stores, as waste liquid, the liquid discharged from the liquid discharge head 20 due to maintenance. The maintenance unit 95 is coupled to the waste liquid storage 97 through unillustrated pump and waste liquid flow path to deliver, as waste liquid, the liquid discharged from the liquid discharge head 20 due to maintenance. Both ends of the waste liquid flow path are coupled to the maintenance unit 95 and a needle section 98 of the waste liquid storage 97. The liquid discharge apparatus 11 includes a tray 99 on which the supply mechanism 85 and the waste liquid storage 97 are placed. The tray 99 houses a liquid absorbing member (not illustrated) that can absorb liquid.

Moving Mechanism of Liquid Discharge Head 20

Figure 3:
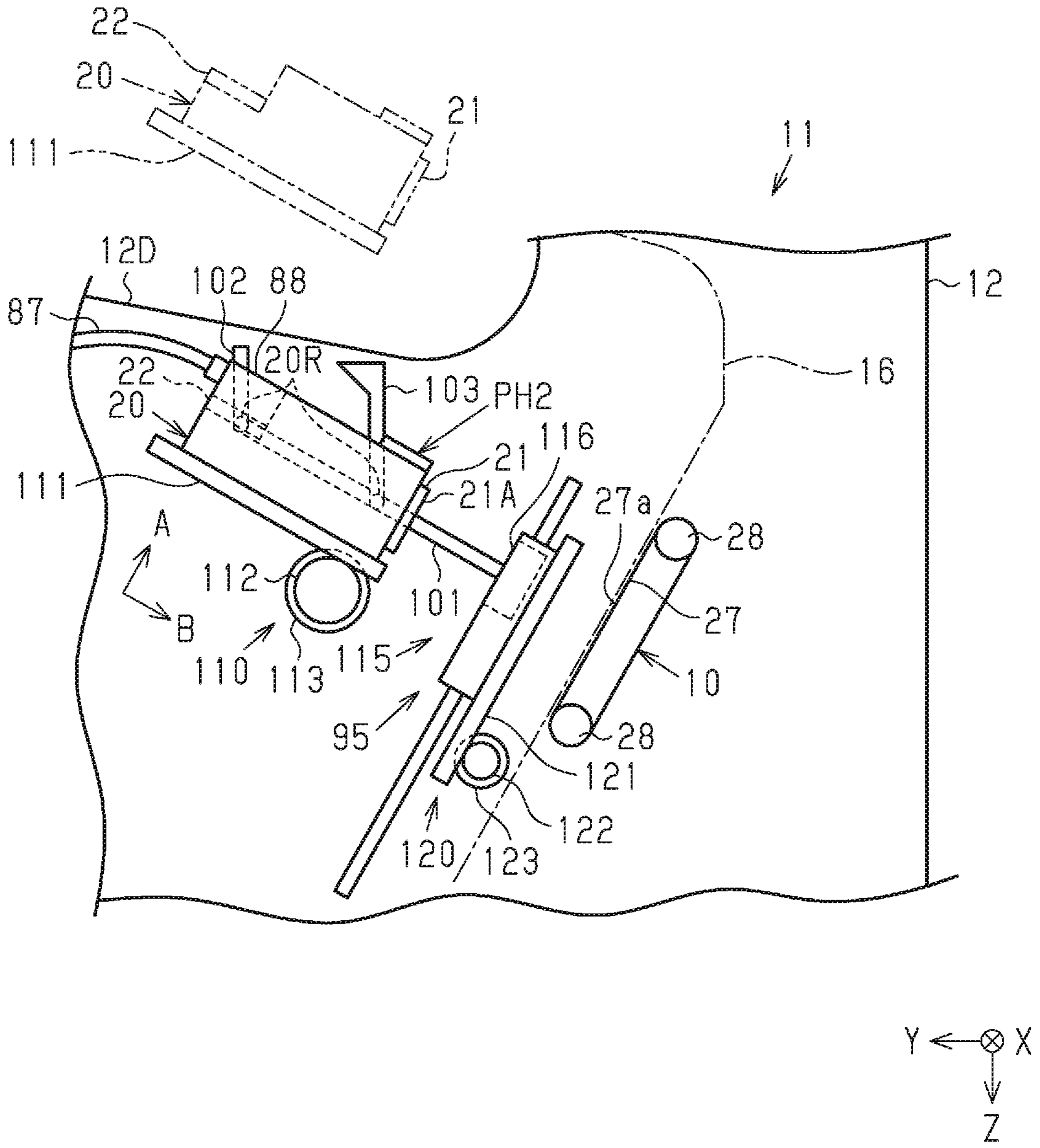
FIG. 3 is a schematic front cross-sectional view for explaining a moving mechanism of the liquid discharge head.

Next, referring to FIG. 3, the moving mechanism of the liquid discharge head 20 will be described. As illustrated in FIG. 3, the liquid discharge head 20 is movable in B direction which is a direction opposed to the transport surface 27*a*. The B direction may be inclined to a horizontal plane by a predetermined angle. The liquid discharge apparatus 11 includes a guide rail 101 that movably guides the liquid discharge head 20 in the B direction. The liquid discharge head 20 includes guide rollers 20R engaged with the guide rail 101. A plurality of guide rollers 20R are guided to the guide rail 101, thus the liquid discharge head 20 is moved in the B direction.

As illustrated in FIG. 3, the liquid discharge apparatus 11 includes a moving mechanism 110 that causes the liquid discharge head 20 to move in the B direction. The moving mechanism 110 is, for example, a rack and pinion mechanism. The moving mechanism 110 is configured to include a rack 111 and a drive gear 112, for example. The drive gear 112 is driven by the power of a motor 113 that is a drive source of the moving mechanism 110. When motor 113 is driven in a normal direction, the liquid discharge head 20 is moved in +B direction. In contrast, when the motor 113 is driven in a reverse direction, the liquid discharge head 20 is moved in −B direction. The liquid discharge head 20 is moved in a movement direction (±B direction), and placed at the print position PH1 (FIG. 2) and the replacement position PH2.

The print position PH1 is the position of the liquid discharge head 20 when printing is performed on the medium M. The replacement position PH2 is the position when the liquid discharge head 20 is replaced. As illustrated in FIG. 3, the liquid discharge apparatus 11 includes guide rails 102,103 for replacement to detach or attach the liquid discharge head 20 from or to the apparatus body 12 at the replacement position PH2. Note that as other stop positions of the liquid discharge head 20, there are a cap position and a retreat position on the movement path between the print position PH1 and the replacement position PH2.

The maintenance unit 95 illustrated in FIG. 3 includes a cap unit 115 having a cap 116. The cap 116 is capable of capping to cover the nozzles 21N by coming into contact with the nozzle surface 21A of a head 21.

As illustrated in FIG. 3, the liquid discharge apparatus 11 includes a moving mechanism 120 that causes the cap unit 115 to move in A direction crossing (for example, perpendicular to) the B direction that is the movement direction of the liquid discharge head 20. The moving mechanism 120 is, for example, a rack and pinion mechanism, and includes a rack 121, a drive gear 122, and a motor 123. When the motor 123 is driven in a normal direction, the cap unit 115 is moved in +A direction, and when the motor 123 is driven in a reverse direction, the cap unit 115 is moved in −A direction. When the liquid discharge head 20 is moved in +B direction from the retreat position with the cap 116 of the cap unit 115 located at the capping position opposed to the head 21, illustrated in FIG. 3, capping is performed on the liquid discharge head 20. In a capping state, a substantially closed space communicating with the nozzles 21N is formed between the nozzle surface 21A and the cap 116, thus the liquid in the nozzles 21N is prevented from being dried. In addition, in the capping state, the nozzles 21N are cleaned by forcibly discharging liquid such as ink into the cap 116 through the nozzles 21N of the head 21. The liquid in the nozzles 21N is forcibly discharged along with the thickened ink and air bubbles by the cleaning, thus poor discharge of the liquid discharge head 20 is prevented or eliminated.

As illustrated in FIG. 3, at the time of head replacement, the liquid discharge head 20 is moved along the guide rail 101, for example, from the cap position to the replacement position PH2. When the liquid discharge head 20 is at the replacement position PH2, it can be detached or attached from or to the apparatus body 12 by the guide rollers 20R moving along two guide rails 102,103 in the vertical direction Z. At the replacement position PH2, the liquid discharge head 20 is detached from the apparatus body 12 by an operator lifting the liquid discharge head 20 upward along the guide rails 102,103.

When replacing the liquid discharge head 20, an operator uses the operation section 19A to perform an operation to instruct head replacement, then the controller 100 drives the motor 113 in a reverse direction to cause the liquid discharge head 20 to move to the replacement position PH2. With the discharge tray 18A detached, an operator detaches the joint 88 from the liquid discharge head 20 through the opening 12D. Next, the liquid discharge head 20 is detached from the apparatus body 12 as shown by a double-dotted line in FIG. 3.

During printing, valves 38, 40 (see FIG. 6) capable of opening and closing the supply flow path 87 coupling the reservoir 86 and the liquid discharge head 20 are in an open state, and the liquid supplied from the reservoir 86 is discharged from the liquid discharge head 20. While printing is not performed, the valves 38, 40 are in a closed state. Since the valves 38,40 are closed like this while printing is not performed, when the disturbances as mentioned below occur at the time of head replacement, liquid may drip from the joint 88 detached from the liquid discharge head 20. Examples of disturbances (causes) of dripping of liquid from the joint 88 include the following.

(a) The tube of the supply flow path 87 is pressed by an operator during head replacement work.

(b) Acceleration or impact is applied when the joint 88 is detached from the liquid discharge head 20.

(c) Air bubbles are present within the tube of the supply flow path 87. Note that in (c), the air bubbles reduce a holding pressure that is a negative pressure applied in a direction to prevent liquid from dripping from the joint 88.

In this embodiment, contamination in the apparatus body 12 by the liquid dripped from the joint 88 due to the cause of one of the above-mentioned (a)~(c) is prevented or reduced from the following two points of view.

Point of View 1: Even when Liquid Drips, No Contamination Occurs in the Apparatus Body.

Point of View 2: Dripping of liquid is prevented or reduced.

Even when work of detachment of the liquid discharge head 20 from the apparatus body 12 is performed with the joint 88 coupled to the liquid discharge head 20, in a case in which the above-mentioned disturbances occur, liquid may drip through the nozzles 21N of the liquid discharge head 20. In this respect, with the joint 88 coupled to the liquid discharge head 20, the points of view 1, 2 are also for reducing dripping of liquid through the nozzles 21N of the liquid discharge head 20.

Figure 4:
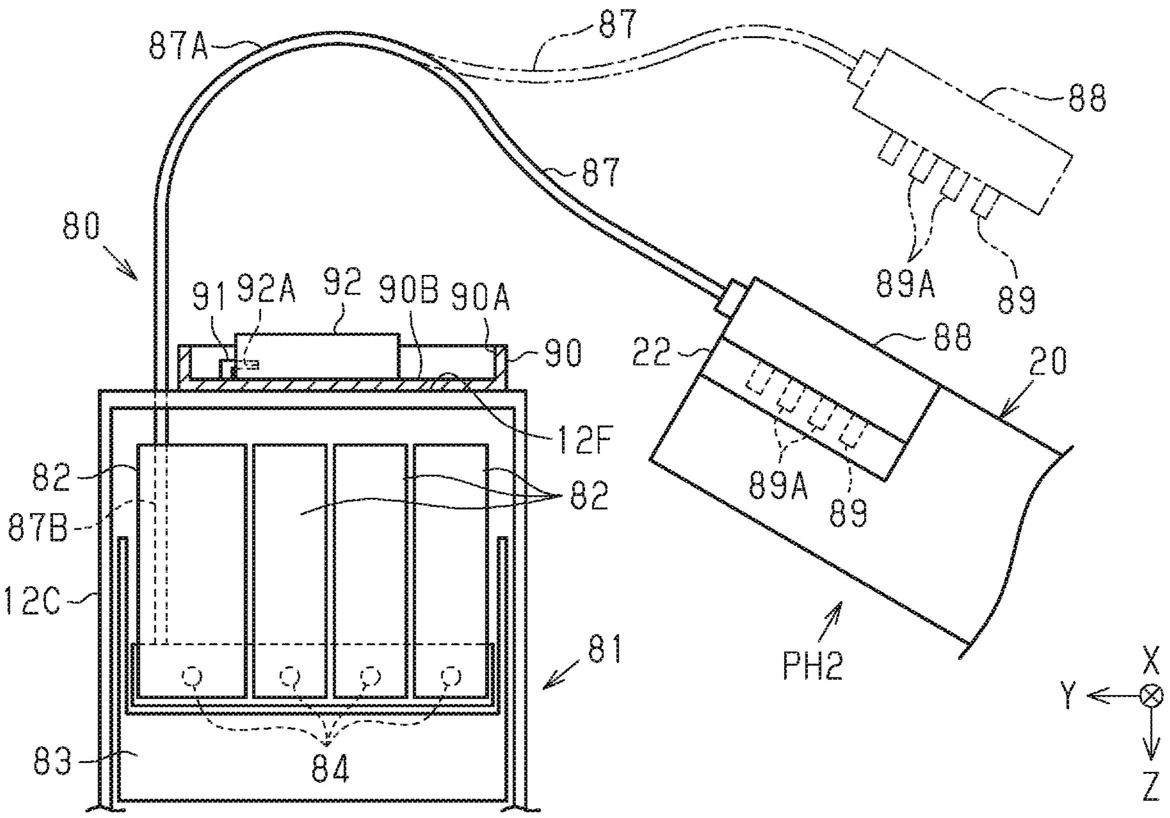
FIG. 4 is a schematic front view for explaining a configuration related to replacement work of the liquid discharge head.

First, referring to FIG. 2, FIG. 4 and FIG. 5, the configuration to be adopted from the point of view 1 will be described. As illustrated in FIG. 4, the joint 88 has couplers 89 to be coupled to the liquid discharge head 20. The liquid discharge head 20 has the female coupler 22 configured to be coupled to the couplers 89 of the joint 88. With the couplers 89 of the joint 88 coupled to the female coupler 22, at least part of the supply flow path 87 passes above the mounting section 83, and is coupled to the liquid discharge head 20.

The couplers 89 includes the same number of pipes 89A as the number of supply flow paths 87. Each supply flow path 87 constitutes part of a circulation flow path for circulating liquid between the reservoir 86 and the inside of the liquid discharge head 20. Thus, the supply flow path 87 includes a delivery flow path 37 to deliver liquid from the reservoir 86 to the liquid discharge head 20, and a return flow path 39 (see FIG. 6 for each flow path) to return liquid from the liquid discharge head 20 to the reservoir 86. For each of reservoirs 86 that store different types of liquid, the supply flow path 87 has the delivery flow path 37 and the return flow path 39. Thus, let N be the number of liquid storages 82 and reservoirs 86, the N being a natural number, then the supply flow paths 87 are composed of 2N flow paths. The variable sections 87A of the supply flow paths 87 are composed of, for example, 2N tubes. The couplers 89 of the joint 88 have 2N pipes 89A. For example, when the liquid discharge apparatus 11 is configured to perform printing using ink of four colors, the supply flow paths 87 are composed of four delivery flow paths 37 and four return flow paths 39.

As illustrated in FIG. 4, the liquid discharge apparatus 11 includes the retainer 90 that can retain the joint 88 detached from the liquid discharge head 20. The retainer 90 is formed in a bottomed box shape with an opening upward. As illustrated in FIG. 4, the retainer 90 may have a dish shape having an opening 90A upward. The bottomed box shape with an opening upward refers to the shape including a bottom having a placement surface 90B on which the joint 88 is placeable, and an annular outer peripheral section that is higher in height than the placement surface 90B, and surrounds the placement surface 90B. The shape in a plan view of the retainer 90 as seen in the vertical direction Z is not limited to a rectangle, and may be a circle, an oval, or a polygon other than quadrilaterals. The dish shape refers to a shape in which the height dimension is smaller than the smallest dimension in a direction parallel to the placement surface 90B of the retainer 90. The retainer 90 may have a dish shape having a bottom and a side, or a dish shape in which the outer peripheral section of the bottom is bent or curved upward.

The retainer 90 is horizontally disposed on the upper surface of the frame unit 12F with the opening 90A facing up. The frame unit 12F may be part of the frame 12C in which the liquid discharge head 20 is housed, or may be provided separately from the frame 12C. The frame unit 12F may be part (for example, an upper part) of a housing frame in which the liquid storage 82 is housed. When the mounting section 83 has, as its part, the housing frame in which the liquid storage 82 is housed as illustrated in FIG. 4, the retainer 90 may be disposed on the upper surface of the mounting section 83.

Figure 5:
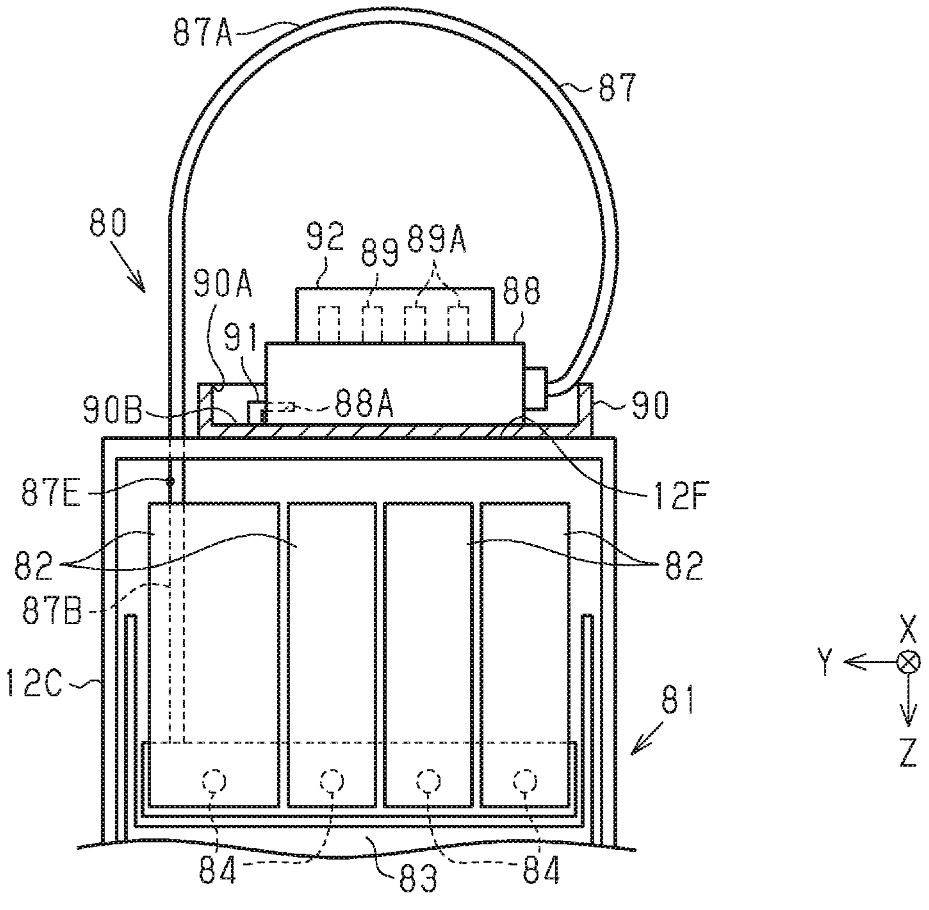
FIG. 5 is a schematic front view illustrating a state where a joint is placed on a retainer.

As illustrated in FIG. 4, FIG. 5, the inner peripheral section of the retainer 90 is provided with a latch 91. The latch 91 may be provided at a position closer to the outer periphery than a central section of the placement surface 90B of the retainer 90. In the examples illustrated in FIG. 4, FIG. 5, the latch 91 is provided in the bottom, but may be provided in the outer peripheral section (for example, the lateral section). The latch 91 may have an L shape as illustrated in a front view of FIG. 4, FIG. 5, for example. The latch 91 is latched in the joint 88 placed on the retainer 90, and is provided to retain the joint 88 in a posture with the couplers 89 facing up. In this respect, the shape and mechanism of the latch 91 may be selected as appropriate as long as the joint 88 is retainable in a posture with the couplers 89 facing up.

As illustrated in FIG. 4, the liquid discharge apparatus 11 may include a cap 92 detachably provided in the retainer 90. The cap 92 is configured to be attachable to and detachable from the couplers 89 of the joint 88 detached from the liquid discharge head 20. The cap 92 can cover the couplers 89 of the detached joint 88. The cap 92 may be retained by the retainer 90 with latched by the latch 91. In this situation, the cap 92 may have a female latch 92A that is engageable with the latch 91. The cap 92 may be retained on the placement surface 90B of the retainer 90 by engagement between the latch 91 and the female latch 92A with the opening side of the cover facing down.

As illustrated in FIG. 4, the liquid discharge head 20 is disposed at the replacement position PH2 at the time of head replacement. The joint 88 is coupled to the female coupler 22 positioned at an upper section of the liquid discharge head 20 in a posture with the couplers 89 facing down. With the couplers 89 of the joint 88 coupled to the female coupler 22, at least part of the supply flow path 87 passes above the mounting section 83, and is coupled to the liquid discharge head 20.

When detaching the joint 88 from the female coupler 22, an operator lifts the joint 88 upward. Thus, the joint 88 can be detached from the female coupler 22 of the liquid discharge head 20. Herein, the direction of detachment of the joint 88 is not limited to −Z direction (upper direction), and may be a diagonally upward direction which forms an acute angle with −Z direction. The female coupler 22 may be provided at the lateral section of the liquid discharge head 20 in the depth direction X, instead of at the upper section thereof, and the joint 88 may be configured to be attachable to and detachable from the female coupler 22 in the depth direction X or a diagonally upward direction which forms an acute angle with the depth direction X.

As illustrated in FIG. 5, the retainer 90 is configured to retain the joint 88 with the couplers 89 facing up. The joint 88 detached from the liquid discharge head 20 is placed on the placement surface 90B of the retainer 90 by an operator. The retainer 90 is provided at a position closer to a base end of the supply flow path 87 than the female coupler 22 of the liquid discharge head 20, the base end being one end of the supply flow path 87 and near the reservoir 86. The position for disposing the retainer 90 is set so that the retainer 90 is placed at a position closer to the base end of the supply flow path 87 extending from the reservoir 86 than the position at which the joint 88 is coupled to the female coupler 22 of the liquid discharge head 20 illustrated in FIG. 4.

Particularly, when the supply flow path 87 has a variable section 87A and a fixed section 87B, as illustrated in FIG. 5, a base end 87E which is an end, closer to the fixed section 87B, of the variable section 87A of the supply flow path 87 is assumed to be at the position illustrated in FIG. 5, for example. In this situation, the retainer 90 is provided at a position closer to the base end 87E which is one end, closer to the fixed section 87B, of the variable section 87A of the supply flow path 87 than the female coupler 22 of the liquid discharge head 20.

Thus, as illustrated in FIG. 5, the joint 88 is easily retained by the retainer 90 in an orientation with the couplers 89 facing up. Specifically, even when the couplers 89 are placed on the retainer 90 in an orientation with the couplers 89 facing up, which is the opposite orientation to the orientation with the couplers 89 facing down when coupled to the female coupler 22 of the liquid discharge head 20, an unnatural force is not applied to the supply flow path 87. As illustrated in FIG. 5, the supply flow path 87 extending from the joint 88 is held in the form of a circular arc path. Specifically, with the joint 88 placed on the retainer 90 in an orientation with the couplers 89 facing up, the supply flow path 87 is held in the form of a circular arc path, which is unlikely to be subjected to a load due to tension, fracture, or torsion.

The joint 88 has a female latch 88A at a position corresponding to the latch 91. With the latch 91 engaged with the female latch 88A, the joint 88 is retained by the retainer 90 in a posture with the couplers 89 facing up. In the joint 88, the posture of the couplers 89 facing up is likely to be lost due to an elastic reaction force received from a curved supply flow path 87. However, the joint 88 is latched by the retainer 90 due to the engagement between the latch 91 and the female latch 88A, thus even if an elastic reaction force is received from the supply flow path 87, or if an operator performing head replacement work accidentally touches a coupler 89, the posture of the coupler 89 facing up is maintained. Therefore, liquid is unlikely to drip from the couplers 89 of the joint 88, and even if liquid drips, the liquid dripped is collected in the retainer 90. Thus, contamination in the apparatus body 12 by the liquid dripped from the joint 88 is prevented.

Figure 6:
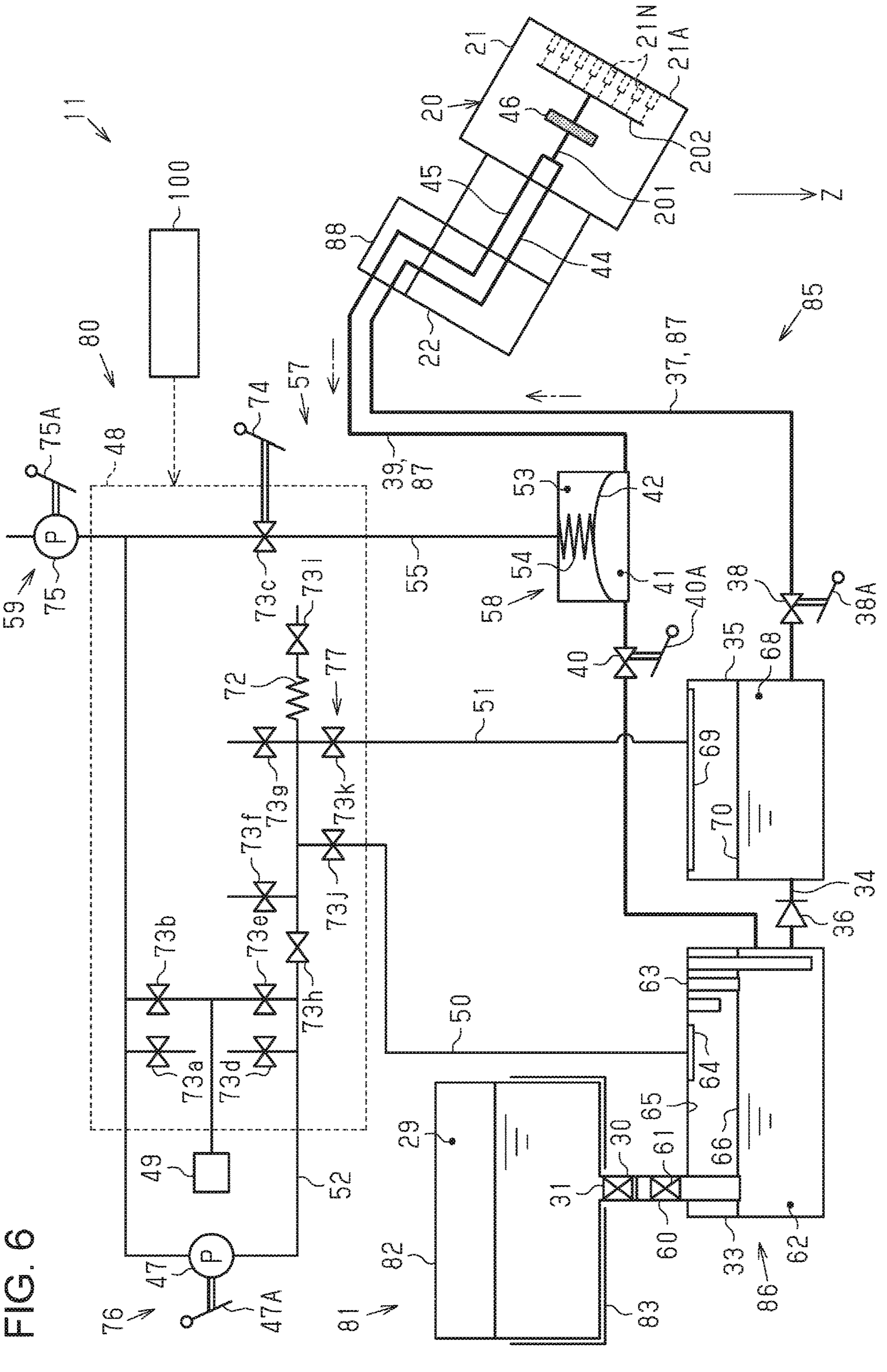
FIG. 6 is a schematic view of a liquid supply unit.

Next, before a configuration to adopt the point of view 2 is explained, the configuration of the liquid supply unit 80 used to implement a configuration which can prevent or reduce dripping of liquid in the liquid discharge apparatus 11 will be described with reference to FIG. 6. FIG. 6 illustrates part of supply of liquid from the reservoir 86 of the liquid supply unit 80, which stores one type of liquid, to the liquid discharge head 20.

As illustrated in FIG. 6, the liquid supply unit 80 includes the above-described liquid supply member 81. The liquid supply member 81 is comprised of the supply mechanism 85 including: the mounting section 83 to which the liquid storage 82 is detachably attached, and the reservoir 86 coupled to the liquid storage 82 via the mounting section 83. The supply mechanism 85 supplies the liquid stored in the reservoir 86 to the liquid discharge head 20. The reservoir 86 includes a first reservoir 33 and a second reservoir 35.

The liquid discharge apparatus 11 may include a plurality of supply mechanisms 85. The plurality of supply mechanisms 85 may supply different types of liquid to the liquid discharge head 20. For example, the liquid discharge apparatus 11 may perform color printing by discharging ink of multiple colors supplied by the plurality of supply mechanisms 85.

As illustrated in FIG. 6, the liquid supply unit 80 includes a drive mechanism 57 that drives the supply mechanism 85. When a plurality of supply mechanisms 85 are provided according to types of liquid, the liquid discharge apparatus 11 may include a plurality of drive mechanisms 57 that drive the plurality of supply mechanisms 85 individually. Alternatively, the liquid discharge apparatus 11 may include one drive mechanism 57 that collectively drives the plurality of supply mechanisms 85.

The liquid storage 82 may include: a storage chamber 29 that stores liquid; an outlet section 30 to deliver the liquid stored in the storage chamber 29; and an outlet valve 31 provided in the outlet section 30. The storage chamber 29 of this embodiment is a sealed space not communicating with the atmosphere. The liquid storage 82 before mounted on the mounting section 83 may store an amount of liquid greater than the amount of liquid retainable by the supply mechanism 85.

The supply mechanism 85 includes the first reservoir 33 and the second reservoir 35 as the reservoir 86 that stores the liquid supplied from the liquid storage 82. The first reservoir 33 and the second reservoir 35 are coupled to each other via a communication path 34. The supply mechanism 85 includes a one-way valve 36 that can open and close the communication path 34.

The supply flow path 87 includes the delivery flow path 37 that couples the second reservoir 35 and the liquid discharge head 20, and the return flow path 39 that couples the liquid discharge head 20 and the first reservoir 33. The delivery flow path 37 is a flow path to supply liquid from the second reservoir 35 to the liquid discharge head 20. The return flow path 39 is a flow path to return liquid from the liquid discharge head 20 to the first reservoir 33.

The return flow path 39 may include a liquid chamber 41 in part. Part of the liquid chamber 41 is a flexible section 42, and deformation of the flexible section 42 changes the volume of the liquid chamber 41.

The supply mechanism 85 includes a first valve 38 that can open and close the delivery flow path 37, and a second valve 40 that can open and close the return flow path 39. The valves 38, 40 are provided in the middle of the supply flow path 87. Specifically, the first valve 38 is provided in the middle of the delivery flow path 37. In addition, the second valve 40 is provided in the middle of the return flow path 39. The second valve 40 is provided at a position between the liquid chamber 41 and the first reservoir 33 on the return flow path 39.

The valves 38, 40 are, for example, electromagnetic valves, and controlled by the controller 100. In this manner, the liquid discharge apparatus 11 includes the valves 38, 40 that can open and close the supply flow path 87, and the controller 100 that can control the opening and closing of the valves 38, 40.

The valves 38, 40 are each a normally closed valve that automatically closes the supply flow path 87 when power supply is OFF. Specifically, the first valve 38 is a normally closed valve, and automatically closes the delivery flow path 37 when power supply is OFF. Also, the second valve 40 is a normally closed valve, and automatically closes the return flow path 39 when power supply is OFF.

The valves 38, 40 of this embodiment are configured to be manually openable and closable when power supply is OFF. When performing head replacement work in a power OFF state, an operator can manually switch the first valve 38 and the second valve 40 from a closed state to an open state.

The liquid discharge head 20 includes a first flow path 44 which is caused to communicate with the delivery flow path 37 by coupling between the joint 88 and the female coupler 22, and a second flow path 45 which is caused to communicate with the return flow path 39 by coupling between the joint 88 and the female coupler 22. The first flow path 44 and the second flow path 45 are both coupled to a head flow path 201. Specifically, the downstream end of the first flow path 44, the upstream end of the second flow path 45, and the upstream end of the head flow path communicate with each other through a liquid chamber (not illustrated). The head flow path 201 is coupled to a common flow path 202. The common flow path 202 communicates with the nozzles 21N through a pressure chamber (not illustrated). The wall in part of the pressure chamber is provided with a piezoelectric element, and change in the volume of the pressure chamber due to driving of the piezoelectric element causes liquid to be discharged through the nozzles 21N communicating with the pressure chamber.

A filter 46 is provided in the middle of the head flow path 201. Liquid with foreign materials and air bubbles removed by the filter 46 is supplied to the common flow path 202 and the nozzles 21N. Therefore, poor discharge caused by foreign materials and air bubbles in the nozzles 21N is prevented. The filter 46 has a mesh structure or a porous structure.

When the liquid discharge head 20 movable by the moving mechanism 110 in the B direction is at the print position PH1 which is the lowest position in the vertical direction Z on a movement path, the liquid surface of the reservoir 86 is at a position lower than the opening height position of any nozzle 21N. The first reservoir 33 and the second reservoir 35 are coupled via the communication path 34 provided with the one-way valve 36 that is openable and closable by a differential pressure. For this reason, a first liquid surface 66 that is the liquid surface of the first reservoir 33 and a second liquid surface 70 that is the liquid surface of the second reservoir 35 are approximately at the same height in many cases. Even if one of the first liquid surface and the second liquid surface fluctuates to a maximum height higher than a standard height position, the opening height position of any nozzle 21N is set to be higher than the liquid surface at the maximum height.

Therefore, the liquid within the nozzles 21N, a negative pressure is generated due to a water head difference between the first liquid surface 66 of the first reservoir 33 and the second liquid surface 70 of the second reservoir 35, and the liquid surface of meniscus formed in the openings of the nozzles 21N. Due to the negative pressure, liquid does not drip from the nozzles 21N. In addition, due to the negative pressure, a meniscus is formed on the liquid in the nozzles 21N.

The drive mechanism 57 includes a pump 47 that adjusts the pressure of a gas phase section within the second reservoir 35. The drive mechanism 57 may include a switching mechanism 48 coupled to the pump 47, and a pressure sensor 49 that detects a pressure. The drive mechanism 57 may include an atmosphere open path 50 coupled to the first reservoir 33, a pressurization flow path 51 coupled to the second reservoir 35, and a coupling flow path 52 that couples the atmosphere open path 50 and the pressurization flow path 51 to the pump 47.

The pump 47 is, for example, a tube pump that sends air by a roller rotating while flattening a tube. In the tube, which is not illustrated, of the pump 47, one end is coupled to an air flow path 55, and the other end is coupled to the coupling flow path 52. The pump 47 is driven in a normal direction, thereby sending the air taken from the air flow path 55 to the coupling flow path 52. The pump 47 is driven in a reverse direction, thereby sending the air taken from the coupling flow path 52 to the air flow path 55.

The air flow path 55 is coupled to a variable capacity mechanism 58. The variable capacity mechanism 58 is a mechanism that changes the volume of the liquid chamber 41. The variable capacity mechanism 58 includes the flexible section 42, an air chamber 53 separated from the liquid chamber 41 with the flexible section 42 interposed between the chambers, and a spring 54 provided in the air chamber 53. The air flow path 55 communicates with the air chamber 53. The spring 54 presses the flexible section 42, thereby reducing the pressure variation of the liquid in the return flow path 39 and the liquid discharge head 20 by changing the volume of the liquid chamber 41. The variable capacity mechanism 58 changes the volume of the liquid chamber 41 by causing the air chamber 53 to be pressurized or depressurized through the air flow path 55, the liquid chamber 41 being separated from the air chamber 53 with the flexible section 42 interposed between the chambers. In short, the variable capacity mechanism 58 changes the volume of the liquid chamber 41 by pneumatic drive. The variable capacity mechanism 58 is provided in the return flow path 39 between the liquid discharge head 20 and the second valve 40, and is driven to pressurize the liquid in the return flow path 39, for example.

Configuration of First Reservoir 33

Next, the first reservoir 33 will be described. The first reservoir 33 has an inlet section 60 that can introduce the liquid stored in the liquid storage 82 mounted on the mounting section 83. The first reservoir 33 may have an inlet valve 61 provided in the inlet section 60, a first reservoir chamber 62 that stores liquid, a liquid amount sensor 63 that detects an amount of liquid stored in the first reservoir chamber 62, and a first gas-liquid separation film 64 that separates the first reservoir chamber 62 from the atmosphere open path 50. The first gas-liquid separation film 64 is a film having properties such that the film allows gas to pass therethrough, whereas the film allows no liquid to pass therethrough.

The outlet valve 31 and the inlet valve 61 are opened by the liquid storage 82 being mounted on the mounting section 83, and as long as the liquid storage 82 is mounted on the mounting section 83, an open valve state is maintained. When the liquid storage 82 is mounted on the mounting section 83, the inlet valve 61 is configured to be opened before the outlet valve 31 is opened, thus the possibility of leakage of liquid from the liquid storage 82 can be reduced.

The inlet section 60 is provided above the first reservoir 33. The inlet section 60 in this embodiment is provided to penetrate a top plate 65 of the first reservoir chamber 62. The lower end of the inlet section 60 is located at a predetermined height of the first reservoir chamber 62. The inlet section 60 is coupled to the outlet section 30 included in the liquid storage 82 by the liquid storage 82 being mounted on the mounting section 83.

The lower end of the inlet section 60 is located below the nozzle surface 21A. Thus, the first liquid surface 66 of the liquid stored in the first reservoir 33 varies in a range lower than the nozzle surface 21A. Specifically, the liquid in the liquid storage 82 is supplied to the first reservoir 33 by a water head through the outlet section 30 and the inlet section 60. Air is introduced from the first reservoir 33 to the liquid storage 82 in an amount corresponding to the liquid supplied to the first reservoir 33 through the inlet section 60 and the outlet section 30. The first liquid surface 66 is raised by a level corresponding to the supplied liquid. When the first liquid surface 66 reaches the lower end of the inlet section 60, inflow of air from the first reservoir 33 to the liquid storage 82 is restricted. Since the storage chamber 29 is sealed, when inflow of air is restricted, the pressure in the storage chamber 29 decreases by a level corresponding to the supplied liquid. When the negative pressure in the storage chamber 29 becomes higher than the water head of the liquid in the storage chamber 29, supply of liquid from the liquid storage 82 to the first reservoir 33 is restricted.

The first liquid surface 66 is lowered when liquid is supplied from the first reservoir 33 to the second reservoir 35. When the first liquid surface 66 is lowered, and air flows into the storage chamber 29 through the inlet section 60 and the outlet section 30, the negative pressure in the storage chamber 29 decreases. When the negative pressure in the storage chamber 29 becomes smaller than the water head of the liquid in the storage chamber 29, liquid is supplied from the liquid storage 82 to the first reservoir 33. Therefore, while liquid is stored in the liquid storage 82, the first liquid surface 66 is maintained at a standard position which is near the lower end of the inlet section 60. When no liquid is stored in the liquid storage 82, the first liquid surface 66 is located below the standard position.

The liquid amount sensor 63 may detect that the first liquid surface 66 is located at the standard position, the first liquid surface 66 is located lower than the standard position, or the first liquid surface 66 is located at a full position higher than the standard position. When the first liquid surface 66 is located at a full position, the first reservoir 33 stores a maximum amount of liquid. When the liquid amount sensor 63 detects that the first liquid surface 66 is located lower than the standard position, the controller 100 determines that the liquid storage 82 is empty, and may instruct a user to replace the liquid storage 82.

In the first reservoir chamber 62, the standard position of this embodiment is located higher than the position to which the downstream end of the return flow path 39 is coupled. Therefore, when the first liquid surface 66 is at the standard position, the liquid in the first reservoir 33 can be supplied to the liquid discharge head 20 through the return flow path 39.

Configuration of Second Reservoir 35

Next, the second reservoir 35 will be described. The second reservoir 35 may have a second reservoir chamber 68 that stores liquid, and a second gas-liquid separation film 69 that separates the second reservoir chamber 68 from the pressurization flow path 51. As with the first gas-liquid separation film 64, the second gas-liquid separation film 69 is a film having properties such that the film allows gas to pass therethrough, whereas the film allows no liquid to pass therethrough.

The second reservoir 35 receives supply of liquid from the first reservoir 33 due to a water head difference. The one-way valve 36 allows the flow of liquid from the first reservoir 33 to the second reservoir 35, and restricts the flow of liquid from the second reservoir 35 to the first reservoir 33. The one-way valve 36 is a differential pressure valve, for example. The one-way valve 36 which is a differential pressure valve is opened and closed due to a differential pressure based on the water head difference between the liquid in the first reservoir 33 and the liquid in the second reservoir 35. The one-way valve 36 may also be configured to have a check valve. When the pressure in the first reservoir chamber 62 and the second reservoir chamber 68 is the atmospheric pressure, the second liquid surface 70 of the liquid in the second reservoir 35 is at the same height as the first liquid surface 66. In other words, the second liquid surface 70 is maintained at the standard position which is approximately at the same height as the lower end of the inlet section 60, and varies in a range lower than the nozzle surface 21A. The liquid in the liquid discharge head 20 is maintained at a negative pressure by the water head difference between the liquid in the first reservoir 33 and the liquid in the second reservoir 35. When liquid is consumed in the liquid discharge head 20, the liquid stored in the second reservoir 35 is supplied to the liquid discharge head 20.

When the pressure in the second reservoir 35 is higher than the pressure in the first reservoir 33, the one-way valve 36 closes the communication path 34. Thus, at the time of pressurization in the second reservoir 35 by the pump 47, the one-way valve 36 closes the communication path 34.

The opening and closing of the first valve 38 and the second valve 40 are controlled by the controller 100. The first valve 38 is provided so that the delivery flow path 37 is openable and closable at the time of pressurization by the pump 47. The second valve 40 is provided so that the return flow path 39 is openable and closable.

Configuration of Switching Mechanism 48

Next, the switching mechanism 48 will be described. The switching mechanism 48 includes a narrow tube 72 provided in the coupling flow path 52, and a first selection valve 73*a* to 11th selection valve 73*k* which can open and close a flow path. The narrow tube 72 is meandering and narrow to an extent that flow of liquid is significantly restricted relative to flow of air.

The first selection valve 73*a* is opened to cause the air flow path 55 to communicate with the atmosphere. The second selection valve 73*b* is opened to cause the air flow path 55 and the pressure sensor 49 to communicate with each other. The third selection valve 73*c* is opened to open the air flow path 55, and causes the pump 75 and the air chamber 53 to communicate with each other.

The fourth selection valve 73*d* is opened to cause the coupling flow path 52 between the pump 47 and the eighth selection valve 73*h* to communicate with the atmosphere. The fifth selection valve 73*e* is opened to cause the coupling flow path 52 and the pressure sensor 49 to communicate with each other. The sixth selection valve 73*f* and the seventh selection valve 73*g* are opened to cause the coupling flow path 52 to communicate with the atmosphere. The eighth selection valve 73*h* is opened to open the coupling flow path 52. The ninth selection valve 73*i* is opened to cause the narrow tube 72 to communicate with the atmosphere. The 10th selection valve 73*j* is opened to open the atmosphere open path 50, and causes the first reservoir 33 and the coupling flow path 52 to communicate with each other. The 11th selection valve 73*k* is opened to open the pressurization flow path 51, and causes the second reservoir 35 and the coupling flow path 52 to communicate with each other.

When the pressure in the air chamber 53 is changed, the switching mechanism 48 opens the second selection valve 73*b* and the third selection valve 73*c*, and closes other selection valves. When the pump 75 is driven in a normal direction in this state, the air in the air chamber 53 is discharged through the air flow path 55, and the pressure in the air chamber 53 decreases. When the pump 75 is driven in a reverse direction in this state, air is sent into the air chamber 53 through the air flow path 55, and the pressure in the air chamber 53 increases. At this point, the pressure sensor 49 may detect the pressure in the air flow path 55 and the air chamber 53. The controller 100 may control the driving of the pump 47 based on the result of detection of the pressure sensor 49.

In this embodiment, a drive unit 59 is comprised of the pump 75, the air flow path 55, the air chamber 53, and the spring 54. In this respect, the liquid discharge apparatus 11 includes the drive unit 59. The supply flow path 87 has the flexible section 42 having flexibility in at least part of the supply flow path 87. The drive unit 59 may be configured to displace the flexible section 42 in a direction in which the volume of the supply flow path 87 increases, and to maintain the state of the displaced flexible section 42. Specifically, the pump 75 is driven in a reverse direction with the third selection valve 73*c* open, thus the drive unit 59 displaces the flexible section 42 in a direction in which the volume of the supply flow path 87 increases. When the third selection valve 73*c* is closed in this state, the state of the displaced flexible section 42 can be maintained.

The drive unit 59 may be configured to be controlled by the controller 100, and configured to be manually operable. In this situation, the pump 75 may be configured to be controlled by the controller 100, and may include an operation section 75A that is manually operable.

The switching mechanism 48 may be configured to be controlled by the controller 100, and configured to be manually operable. In this situation, the switching mechanism 48 may include a cam mechanism (not illustrated) configured to allow opening and closing of the selection valves 73*a* to 73*k* to be selectable. The controller 100 is configured to allow opening and closing of the selection valves 73*a* to 73*k* to be selectable by driving the cam mechanism. The switching mechanism 48 may include an operation section 74 by which the cam mechanism is manually operable. In this respect, the third selection valve 73*c* included in the drive unit 59 of the switching mechanism 48 is configured to be controlled by the controller 100, and configured to be manually operable by the operation section 74.

Note that the variable capacity mechanism 58 may be used to slightly pressurize the liquid in the liquid discharge head 20 by changing the flexible section 42. To slightly pressurize refers to pressurization to an extent that breaks the meniscus of each nozzle 21N. With the first valve 38 and the second valve 40 open, the controller 100 pulls liquid into the liquid chamber 41 by depressurizing the air chamber 53 for a predetermined depressurization time, then closes the first valve 38 and the second valve 40. In this state, the controller 100 extrudes the liquid in the liquid chamber 41 by pressurizing the air chamber 53 for a slight pressurization time, thereby slightly pressurizing the liquid in the liquid discharge head 20. The slight pressurization time refers to a time greater than or equal to the time necessary for the pressure at the time of extrusion of liquid in the liquid chamber 41 to propagate to the liquid in the nozzles 21N. When finishing the slight pressurization, the controller 100 opens the air chamber 53 to the atmosphere.

When the first reservoir 33 is opened to the atmosphere, the switching mechanism 48 opens the sixth selection valve 73*f* and the 10th selection valve 73*j*. The first reservoir chamber 62 communicates with the atmosphere through the atmosphere open path 50 and the coupling flow path 52.

When the second reservoir 35 is opened to the atmosphere, the switching mechanism 48 opens the seventh selection valve 73*g* and the 11th selection valve 73*k*. The second reservoir chamber 68 communicates with the atmosphere through the pressurization flow path 51 and the coupling flow path 52.

When the inside of the second reservoir 35 is pressurized, the switching mechanism 48 opens the first selection valve 73*a*, the fifth selection valve 73*e*, the eighth selection valve 73*h*, and the 11th selection valve 73*k*, and closes other selection valves. When the pump 47 is driven in a normal direction in this state, air flows into the second reservoir chamber 68 through the air flow path 55, the coupling flow path 52, and the pressurization flow path 51, and the pressure in the second reservoir chamber 68 increases. At this point, the pressure sensor 49 may detect the pressure in the coupling flow path 52, the pressurization flow path 51, and the second reservoir chamber 68. The controller 100 may control the driving of the pump 47 based on the result of detection of the pressure sensor 49. The controller 100 pressurizes the inside of the second reservoir 35 with the first valve 38 open and the second valve 40 closed, thereby performing cleaning to discharge liquid through the nozzles 21N of the liquid discharge head 20.

When the inside of the first reservoir 33 is depressurized, the switching mechanism 48 opens the first selection valve 73*a*, the fifth selection valve 73*e*, the eighth selection valve 73*h*, and the 10th selection valve 73*j*, and closes other selection valves. When the pump 47 is driven in a reverse direction in this state, the air in the first reservoir chamber 62 is discharged through the air flow path 55, the coupling flow path 52, and the atmosphere open path 50, then the pressure in the first reservoir chamber 62 decreases. At this point, the pressure sensor 49 may detect the pressure in the coupling flow path 52, the atmosphere open path 50, and the first reservoir chamber 62. The controller 100 may control the driving of the pump 47 based on the result of detection of the pressure sensor 49.

When the inside of the second reservoir 35 is depressurized, the switching mechanism 48 opens the first selection valve 73*a*, the fifth selection valve 73*e*, the eighth selection valve 73*h*, and the 11th selection valve 73*k*, and closes other selection valves. When the pump 47 is driven in a reverse direction in this state, the air in the second reservoir chamber 68 is discharged through the air flow path 55, the coupling flow path 52, and the pressurization flow path 51, then the pressure in the second reservoir chamber 68 decreases. At this point, the pressure sensor 49 may detect the pressure in the coupling flow path 52, the pressurization flow path 51, and the second reservoir chamber 68. The controller 100 may control the driving of the pump 47 based on the result of detection of the pressure sensor 49.

In this embodiment, a depressurizer 76 is comprised of the pump 47, the coupling flow path 52, the atmosphere open path 50, the pressurization flow path 51, the first selection valve 73*a*, the fifth selection valve 73*e*, the eighth selection valve 73*h*, the 10th selection valve 73*j*, and the 11th selection valve 73*k*. In this respect, the liquid discharge apparatus 11 includes the depressurizer 76 that can depressurize the space in the reservoirs 33, 35.

In this embodiment, a depressurization maintainer 77 is composed of the 10th selection valve 73*j* and the 11th selection valve 73*k*. In this respect, the liquid discharge apparatus 11 includes the depressurization maintainer 77 that can maintain the space depressurized by the depressurizer 76. The depressurizer 76 and the depressurization maintainer 77 may be configured to be controlled by the controller 100, and configured to be manually operable. In this situation, the pump 47 may be configured to be controlled by the controller 100, and may include an operation section 47A that is manually operable. The first selection valve 73*a*, the fifth selection valve 73*e*, the eighth selection valve 73*h*, the 10th selection valve 73*j*, and the 11th selection valve 73*k* included in the depressurizer 76 are configured to be controlled by the controller 100, and configured to be manually operable by the above-mentioned operation section 74. The 10th selection valve 73*j* and the 11th selection valve 73*k* included in the depressurization maintainer 77 are configured to be controlled by the controller 100, and configured to be manually operable by the above-mentioned operation section 74.

Operation of First Embodiment

Next, the operation of this embodiment will be described.

Figure 9:
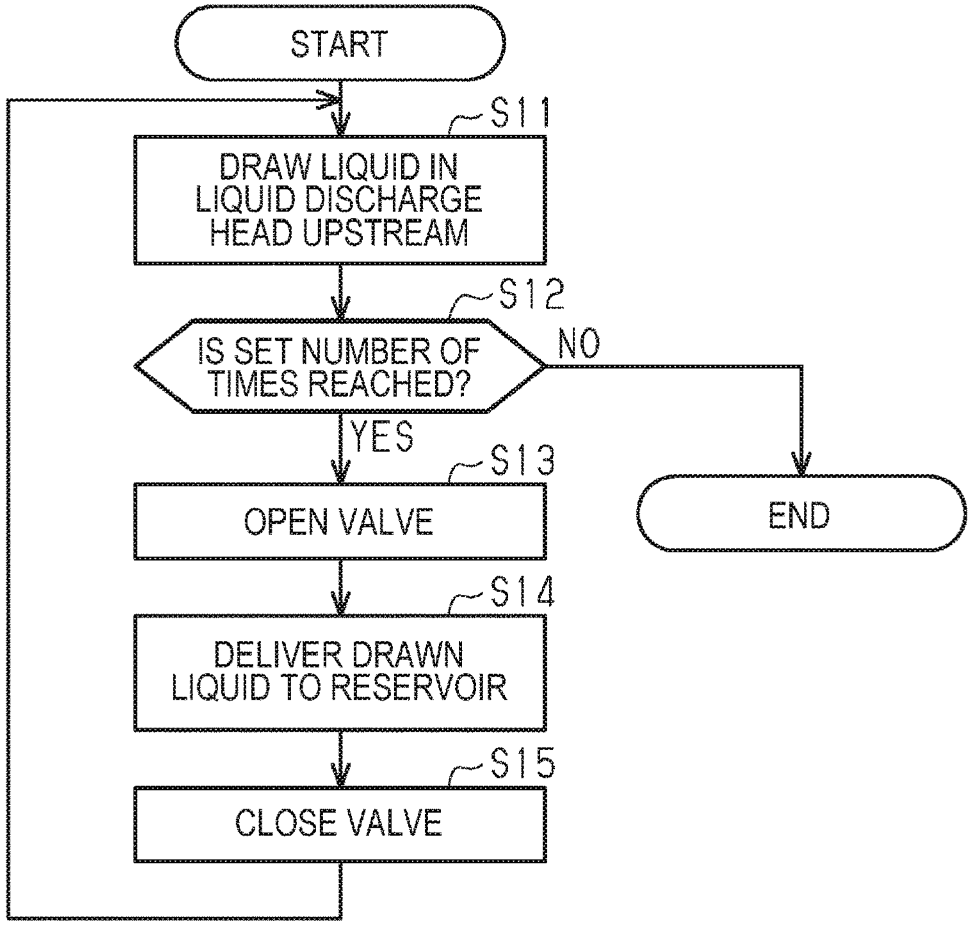
FIG. 9 is a flowchart illustrating a liquid dripping prevention control routine.

An operator operates the operation section 19A to select a service mode on a menu screen displayed on the display unit 19, and further selects the item "head replacement". When receiving instructions for head replacement, the controller 100 moves the liquid discharge head 20 in −B direction to the replacement position PH2 by driving the motor 113 in a reverse direction. Upon detection of movement of the liquid discharge head 20 to the replacement position PH2 based on a signal detected by a sensor which is not illustrated, the controller 100 stops the motor 113. Before the movement, during the movement, or immediately after the movement of the liquid discharge head 20, the controller 100 causes a computer to execute the liquid dripping prevention control routine illustrated in FIG. 9. Note that head replacement work is performed while printing is not performed, thus the first valve 38 and the second valve 40 are in a closed state.

Figure 7:
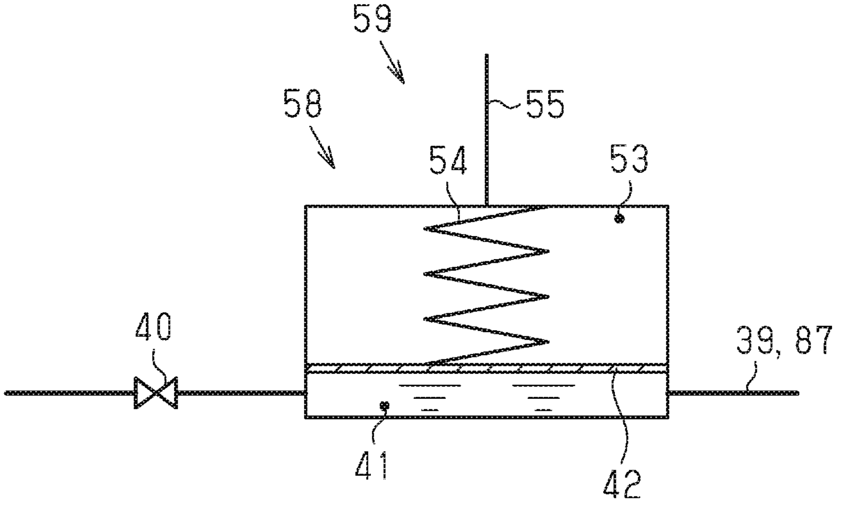
FIG. 7 is a schematic cross-sectional view illustrating a variable capacity mechanism in an initial state.
Figure 8:
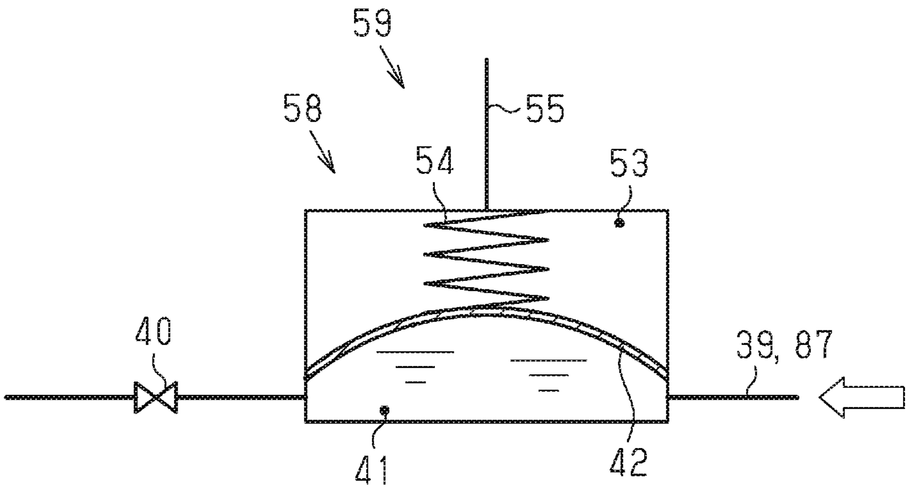
FIG. 8 is a schematic cross-sectional view illustrating the variable capacity mechanism in a state where liquid is sucked.

In step S11, the controller 100 draws the liquid in the liquid discharge head 20 upstream. The controller 100 causes the variable capacity mechanism 58 to execute a drawing operation. Specifically, the controller 100 opens the second selection valve 73*b* and the third selection valve 73*c*, and closes other selection valves by controlling the switching mechanism 48. In this state, the controller 100 drives the pump 75 in a normal direction. In the initial state illustrated in FIG. 7, the air in the air chamber 53 is discharged through the air flow path 55, and the pressure in the air chamber 53 decreases. As illustrated in FIG. 8, the flexible section 42 is raised toward the air chamber 53 by depressurization in the air chamber 53 against the urging force of the spring 54, and accordingly, the volume of the liquid chamber 41 is increased. When the volume of the liquid chamber 41 is increased, in the supply flow path 87, the liquid in the flow path portion downstream of the first valve 38 and upstream of the liquid chamber 41 is drawn to the liquid chamber 41. Specifically, as illustrated by the white arrow in FIG. 8, liquid is drawn into the liquid chamber 41 from the liquid discharge head 20 upstream of the liquid chamber 41. Thus, in the liquid discharge head 20, the liquid downstream (the nozzles 21N) of the filter 46 is drawn upstream in an amount corresponding to the volume of the liquid chamber 41. A gas-liquid interface formed by the meniscus in each nozzle 21N is moved toward the filter 46. In other words, air is taken through the nozzles 21N, and an air area is moved in a depth direction (upstream) of the nozzles 21N.

In next step S12, the controller 100 determines whether liquid drawing number of times has reached a set number of times N. When the set number of times N is not reached, the flow proceeds to step S13, and when the set number of times N is reached, the routine is completed.

In next step S13, the controller 100 opens the valves 38, 40. Specifically, the controller 100 switches the first valve 38 and the second valve 40 from a closed valve state to an open valve state.

In next step S14, the controller 100 delivers the drawn liquid to the reservoir 33. The controller 100 delivers the liquid drawn into the liquid chamber 41 to the reservoir 33. The controller 100 opens the air chamber 53 to the atmosphere, or drives the pump 75 in a reverse direction. In the former case, the volume of the liquid chamber 41 is reduced by the flexible section 42 being pressed down by the urging force of the spring 54. In the latter case, the flexible section 42 is pressed down by the air introduced into the air chamber 53 and the urging force of the spring 54. Consequently, the volume of the liquid chamber 41 is decreased. At this point, liquid is extruded from the liquid chamber 41, and the extruded liquid flows into the first reservoir chamber 62 because of a relationship of water head difference between the liquid discharge head 20 and the first reservoir 33.

In step S15, the controller 100 closes the valves 38, 40. Specifically, the controller 100 switches the first valve 38 and the second valve 40 from an open valve state to a closed valve state.

After the controller 100 completes the process in step S15, the flow returns to step S11. In step S12, the controller 100 repeats the processes in step S11, S13, S14, S15 until the liquid drawing number of times reaches the set number of times N. In this manner, each time a drawing operation is performed to draw liquid into the liquid chamber 41, the controller 100 determines whether the set number of times N is reached, and when not reached, delivers the liquid drawn into the liquid chamber 41 to the first reservoir chamber 62. When the liquid drawing number of times reaches the set number of times N, the routine is completed.

When the controller 100 completes the liquid dripping prevention control, the first valve 38 and the second valve 40 are in a closed state, and the flexible section 42 of the variable capacity mechanism 58 is in a state of being displaced in a direction in which the volume of the liquid chamber 41 is increased. For this reason, when liquid is drawn into the liquid chamber 41 last, a negative pressure generated in the supply flow path 87 is maintained.

In this manner, the controller 100 performs a liquid drawing operation for the set number of times N, and a liquid delivery operation for (N−1) times by the processes in step S11 to step S15. The controller 100 completes the routine with liquid drawn into the liquid chamber 41.

The variable capacity mechanism 58 performs a liquid drawing operation for the set number of times N, and N is a predetermined number of times from 2 to 5, for example. Thus, part of the liquid in the liquid discharge head 20 is drawn toward the supply flow path 87.

The set number of times N may be determined based on a relationship between drawn liquid amount Q per drive of the variable capacity mechanism 58, and flow path volume Vh from the filter 46 in the liquid discharge head 20 to the openings of the nozzles 21N. Specifically, the set number of times N may be set to the number of times until the gas-liquid interface (interface of the meniscus) of the liquid in the liquid discharge head 20 reaches the filter 46. For example, the set number of times N may be set to Nmin that is a minimum natural number N satisfying $N \geq Vh/Q$ or (Nmin+1) obtained by adding "1" to the minimum value Nmin.

The filter 46 has a mesh structure or a porous structure including a large number of micropores. When the gas-liquid interface of liquid reaches the filter 46, a meniscus (hereinafter also referred to as a "micro meniscus") of the liquid is formed in the large number of micropores. The value of bubble point Bp of the micro meniscus is a predetermined value in a range of 5 to 10 kPa, for example. The bubble point prevents the gas-liquid interface of the liquid from moving upstream of the filter 46. Thus, air can be taken into the flow path area from the nozzles 21N to the filter 46 in the liquid discharge head 20. In addition, a relatively high negative pressure (however, a negative pressure is lower than the bubble point pressure) due to the micro meniscus can be generated in the liquid of the flow path portion upstream of the filter 46.

When completing the liquid dripping prevention control, the controller 100 causes the display unit 19 to display information indicating that preparation for head replacement is ready. An operator detaches the discharge tray 18A from the apparatus body 12. For example, an operator loosens a screw (not illustrated) to detach the joint 88 from the liquid discharge head 20 at the replacement position PH2.

When detaching the joint 88 from the liquid discharge head 20, the operator may press the tube of the supply flow path 87 or apply excessive impact to the joint 88 unintentionally. At this point, the gas-liquid interface in the liquid discharge head 20 is located further in the depth direction of the nozzles 21N, as compared to when printing is performed. Therefore, even when the gas-liquid interface in the liquid discharge head 20 is displaced somewhat toward the nozzles 21N, liquid does not drip from the nozzles 21N.

At this point, the gas-liquid interface in the liquid discharge head 20 has reached the filter 46, thus the liquid is prevented from moving toward the nozzles 21N as long as a pressure exceeding the bubble point pressure is not applied to the liquid in the liquid discharge head 20. Even if a pressure exceeding the bubble point pressure is applied to the liquid in the liquid discharge head 20, and the gas-liquid interface is displaced somewhat toward the nozzles 21N, liquid does not drip from the nozzles 21N.

Until the joint 88 is detached from the liquid discharge head 20, a relatively high negative pressure (negative pressure close to the bubble point pressure) is applied to the liquid in the supply flow path 87. Therefore, when the joint 88 is detached from the liquid discharge head 20, the meniscus of the liquid in the couplers 89 moves in the depth direction. Thus, after the joint 88 is detached, even if causes of the above-mentioned disturbances (a) to (c) occur due to accidental pressing of the tube of the supply flow path 87 or applying acceleration or an impact to the joint 88 by an operator, dripping of liquid from the couplers 89 of the joint 88 is prevented.

An operator places the detached joint 88 on the inner bottom surface of the retainer 90 with the couplers 89 facing up. At this point, the latch 91 is latched to the female latch 88A. This latch maintains the couplers 89 in an upward posture even if the joint 88 receives an elastic reaction force from the tube of the supply flow path 87. Since the couplers 89 face up, dripping of liquid from the couplers 89 is prevented. In addition, even if a slight amount of liquid dripped from the couplers 89 streams down the lateral surface of the joint 88 during a period until the joint 88 is placed on the retainer 90, the streamed-down liquid is received by the retainer 90 in a dish shape. Therefore, even if liquid drips from the couplers 89, contamination in the apparatus body 12 is prevented.

As illustrated in FIG. 5, an operator mounts the cap 92 on the joint 88 so as to cover the couplers 89. Even if the joint 88 is detached from the retainer 90 or the joint 88 is turned down or inclined because of a fault of an operator or an elastic reaction force of the tube, no liquid leaks from the couplers 89 covered with the cap 92, thus contamination of the retainer 90 and its periphery caused by the liquid from the joint 88 is prevented. In addition, the cap 92 mounted on the joint 88 prevents the liquid such as ink in the couplers 89 from being thickened or dried.

An operator then detaches the liquid discharge head 20 from the apparatus body 12. An operator pulls up the liquid discharge head 20 at the replacement position PH2 in −Z direction along two guide rails 102, 103. The liquid discharge head 20 is taken out through the opening 12D as shown by a double-dotted line in FIG. 3.

Next, a new liquid discharge head 20 is attached to the apparatus body 12. An operator inserts the liquid discharge head 20 through the opening 12D by setting the guide rollers 20R of the liquid discharge head 20 along the guide rails 102, 103. The liquid discharge head 20 inserted along the guide rails 102, 103 in the vertical direction Z is disposed at the replacement position PH2 shown by a solid line in FIG. 3. Subsequently, an operator detaches the cap 92 from the joint 88 retained by the retainer 90, and couples the joint 88 to the female coupler 22 of the liquid discharge head 20. For example, an operator tightens a screw to fix the joint 88 coupled to the female coupler 22 to the liquid discharge head 20. An operator sets the cap 92 to be retained by the retainer 90. At this point, an operator sets the cap 92 to be retained by the retainer 90 with the latch 91 and the female latch 92A latched together. Finally, the discharge tray 18A is attached to the apparatus body 12 so as to close the opening 12D. In this manner, the liquid discharge head 20 is replaced.

Liquid Dripping Prevention When Power Is OFF

Next, the head replacement work performed in a power OFF state of the liquid discharge apparatus 11 will be described. For some reasons such as a failure of a power supply circuit of the liquid discharge apparatus 11 or blackout, an operator may have no choice but to perform a head replacement work in a power OFF state.

An operator drives the pump 47 and the switching mechanism 48 by a manual operation with the same content as that of the liquid dripping prevention control. Since the first valve 38 and the second valve 40 are normally closed valves, the supply flow path 87 is in a closed state when power supply is OFF.

An operator operates the operation section 74 to manually switch a cam for selection, thereby selecting a switching position to open the second selection valve 73*b* and the third selection valve 73*c*, and close other selection valves.

Next, an operator operates the operation section 47A to manually drive the pump 47 in a normal direction. Starting with the initial state illustrated in FIG. 7, the air in the air chamber 53 is discharged through the air flow path 55, thus the pressure in the air chamber 53 decreases. The decrease of the pressure causes the flexible section 42 to be raised toward the air chamber 53 against the urging force of the spring 54 as illustrated in FIG. 8. Consequently, liquid is drawn into the liquid chamber 41.

Next, an operator operates an operation section 38A to switch the first valve 38 from a closed valve state to an open valve state. In addition, an operator operates an operation section 40A to switch the second valve 40 from a closed valve state to an open valve state. Furthermore, an operator delivers the liquid in the liquid chamber 41 to the first reservoir chamber 62 by a manual operation. Specifically, an operator operates the operation section 74 to perform a cam switching operation to select a switching position to open the first selection valve 73*a* to the third selection valve 73*c*, and close other selection valves. Thus, the inside of the air chamber 53 is opened to the atmosphere. Then the flexible section 42 is pressed down by the urging force of the spring 54, and the volume of the liquid chamber 41 is decreased. At this point, the liquid extruded from the liquid chamber 41 flows into the first reservoir chamber 62. In this manner, one-time drive for pumping is executed to deliver, to the first reservoir chamber 62, a predetermined volume of liquid drawn from the liquid discharge head 20 through the supply flow path 87.

This liquid delivery operation can be performed by another method. After manually setting the first valve 38 and the second valve 40 in an open state, an operator performs the following operations. An operator operates the operation section 74 to perform a cam switching operation to select a switching position to open the second selection valve 73*b* and the third selection valve 73*c*, and close other selection valves. Next, an operator operates the operation section 75A to drive the pump 75 in a reverse direction. Then air is introduced into the air chamber 53. The introduced air and the urging force of the spring 54 cause the flexible section 42 to be pressed down. Decrease of the volume of the liquid chamber 41 causes the liquid extruded from the liquid chamber 41 to flow into the first reservoir chamber 62. In this manner, one-time drive for pumping is executed to deliver, to the first reservoir chamber 62, a predetermined volume of liquid drawn from the liquid discharge head 20 through the supply flow path 87.

An operator executes drive for pumping, for example, for the set number of times N by a manual operation. Note that when drive for pumping is executed on the variable capacity mechanism 58 by a manual operation at the time of power OFF, the number of times of execution may be smaller than the set number of times N at the time of automatic control, or may be arbitrarily selected by an operator from a range less than or equal to an upper limit number of times.

Effects of First Embodiment

The effects of the first embodiment will be described.

(1) The liquid discharge apparatus 11 includes the liquid discharge head 20 that can discharge liquid. The liquid discharge apparatus 11 includes the reservoir 86 configured to store liquid to be supplied to the liquid discharge head 20. The reservoir 86 is provided at a position lower than the liquid discharge head 20. The liquid discharge apparatus 11 includes the supply flow path 87 configured to communicate with the liquid discharge head 20 and the reservoir 86. The supply flow path 87 is provided with the joint 88 detachable from the liquid discharge head 20. The liquid discharge apparatus 11 includes the retainer 90 configured to retain the joint 88 detached from the liquid discharge head 20. The joint 88 has the couplers 89 to be coupled to the liquid discharge head 20. The retainer 90 is configured to retain the joint 88 with the couplers 89 facing up. With this configuration, even when the joint 88 of the supply flow path 87 is detached from the liquid discharge head 20, dripping of liquid from the couplers 89 of the joint 88 can be prevented.

(2) The liquid discharge apparatus 11 is detachably provided in the retainer 90, and further includes the cap 92 detachably provided in the retainer 90, and attachable to and detachable from the couplers 89 of the joint 88 detached from the liquid discharge head 20. With this configuration, dripping of liquid from the couplers 89 can be further prevented.

(3) The retainer 90 is formed in a bottomed box shape with an opening upward. With this configuration, even when liquid drips from the couplers 89, adhesion of liquid to other portions can be prevented.

(4) The valves 38, 40 are normally closed valves that automatically close the supply flow path 87 when power supply is OFF. With this configuration, continuous dripping of liquid from the nozzles due to an unexpected situation at the time of power OFF can be prevented.

(5) The liquid discharge apparatus 11 includes the drive unit 59. The supply flow path 87 has the flexible section 42 having flexibility in at least part of the supply flow path 87. The drive unit 59 can displace the flexible section 42 in a direction in which the volume of the supply flow path 87 increases, and can maintain the state of the displaced flexible section 42. The drive unit 59 is configured to be controlled by the controller 100, and configured to be manually operable. With this configuration, when the supply flow path 87 is detached from the liquid discharge head 20, a negative pressure can be applied to the couplers 89 of the joint 88.

(6) The drive unit 59 displaces the flexible section 42 in a direction in which the volume of the supply flow path 87 increases, and delivers liquid to the reservoir 86 by displacing the flexible section 42 in a direction in which the volume of the supply flow path 87 increases as well as in a direction in which the volume of the supply flow path 87 decreases before the state of displaced flexible section 42 is maintained. With this configuration, when the joint 88 is detached from the liquid discharge head 20, dripping of liquid through the nozzles 21N of the liquid discharge head 20 can be prevented.

(7) The liquid discharge apparatus 11 further includes the mounting section 83 detachably provided with the liquid storage 82 that stores liquid to be supplied to the reservoir 86. The liquid discharge head 20 has the female coupler 22 configured to be coupled to the couplers 89 of the joint 88. The retainer 90 is provided at a position closer to a base end of the supply flow path 87 than the female coupler 22 of the liquid discharge head 20, the base end being one end of the supply flow path 87 and near the reservoir 86. With this configuration, the joint 88 detached from the liquid discharge head 20 is easily retained by the retainer 90. For example, when an operator places the detached joint 88 on the retainer 90, a load due to tension, fracture, or torsion is unlikely to be applied to the supply flow path 87. Specifically, with the joint 88 placed on the retainer 90 in an orientation with the couplers 89 facing up, the supply flow path 87 is held in the form of a circular arc path, which is unlikely to be subjected to a load due to tension, fracture, or torsion.

Second Embodiment

Next, a second embodiment will be described. The second embodiment is different from the first embodiment in the content of liquid dripping prevention control. The configuration of the liquid discharge apparatus 11 and its liquid supply unit is the same as that of the first embodiment.

Figure 10:
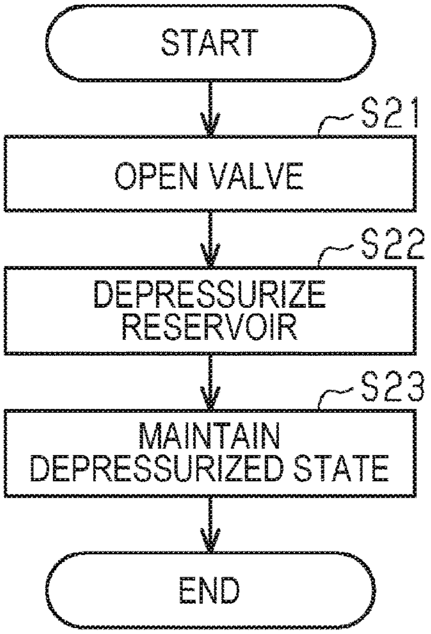
FIG. 10 is a flowchart illustrating a liquid dripping prevention control routine in a second embodiment.

When receiving instructions for head replacement, the controller 100 moves the liquid discharge head 20 to the replacement position. The controller 100 causes a computer to execute the liquid dripping prevention control routine illustrated in FIG. 10.

In step S21, the controller 100 opens the valves 38, 40. Specifically, the controller 100 switches the first valve 38 and the second valve 40 from a closed valve state to an open valve state. A negative pressure according to the water head difference between the liquid in the first reservoir chamber 62 and the second reservoir chamber 68, and the liquid at the nozzle surface 21A of the liquid discharge head 20 is applied to the meniscus of each nozzle 21N. At this point, the liquid discharge head 20 is moved from the cap position to the replacement position, thus the height position of the nozzle surface 21A of the liquid discharge head 20 is displaced in −Z direction by a predetermined distance. In other words, because of the movement of the liquid discharge head 20 to the replacement position, the water head difference between the liquid at the standard position of the liquid surface of the first reservoir chamber 62 and the second reservoir chamber 68, and the meniscus of the liquid at the nozzle surface 21A of the liquid discharge head 20 is further increased, thus a negative pressure applied to the meniscus in each nozzle 21N is increased according to the water head difference. The meniscus of the liquid in the liquid discharge head 20 is moved in a depth direction (upstream direction) of the nozzles 21N.

In step S22, the controller 100 depressurizes the reservoirs 33, 35. Specifically, the controller 100 depressurizes the first reservoir chamber 62 and the second reservoir chamber 68. Specifically, the controller 100 performs switching control on the switching mechanism 48, thereby opening the first selection valve 73*a*, the fifth selection valve 73*e*, the eighth selection valve 73*h*, the 10th selection valve 73*j* and the 11th selection valve 73*k*, and closing other selection valves. In this state, the controller 100 drives the pump 47 in a reverse direction. Thus, the air in the first reservoir chamber 62 is discharged through the air flow path 55, the coupling flow path 52 and the atmosphere open path 50, and the pressure in the first reservoir chamber 62 decreases. At the same time, the air in the second reservoir chamber 68 is discharged through the air flow path 55, the coupling flow path 52, and the pressurization flow path 51, and the pressure in the second reservoir chamber 68 decreases.

Because the first reservoir chamber 62 and the second reservoir chamber 68 are depressurized, the negative pressure applied to the liquid at the position of the meniscus of the liquid further increases by the amount of depressurization in the liquid discharge head 20 communicating with these reservoir chambers 62, 68 through the supply flow path 87. Therefore, the meniscus of the liquid in the liquid discharge head 20 is moved further upstream. Due to the movement of the meniscus, an air area is generated in a portion including the nozzles 21N in the liquid discharge head 20.

The meniscus of the liquid in the liquid discharge head 20 reaches the filter 46 depending on the water head difference based on the distance difference in the vertical direction Z between the liquid surface height in the reservoir chambers 62, 68, and the meniscus height of the liquid in the liquid discharge head 20, as well as the value of depressurization of the reservoir chambers 62, 68. In this situation, as in the first embodiment, areas including the nozzles 21N downstream of the filter 46 are all air areas. A micro meniscus is formed in the filter 46.

In step S23, the controller 100 maintains the depressurized state of the reservoirs. Specifically, the controller 100 opens the first selection valve 73*a*, the fifth selection valve 73*e*, the eighth selection valve 73*h*, the 10th selection valve 73*j* and the 11th selection valve 73*k*. When the reservoir chambers 62, 68 are in a state of communicating with the stopped pump 47, air gradually leaks into the reservoir chambers 62, 68 through the pump 47, thus the reduced pressure in the reservoir chambers 62, 68 gradually approaches the atmospheric pressure. Thus, the controller 100 maintains the depressurized state in the first reservoir chamber 62 and the second reservoir chamber 68 by opening the 10th selection valve 73*j* and the 11th selection valve 73*k*.

When completing the liquid dripping prevention control in this way, the controller 100 causes the display unit 19 to display information indicating that head replacement is ready. After detaching the discharge tray 18A from the apparatus body 12, an operator detaches the joint 88 from the liquid discharge head 20.

When an operator detaches the joint 88 from the liquid discharge head 20, the operator may press the tube of the supply flow path 87 or apply an excessive acceleration or impact to the joint 88 unintentionally. At this point, the gas-liquid interface of the liquid in the liquid discharge head 20 is located further in the depth direction of the nozzles 21N, as compared to when printing is performed, thus even when the gas-liquid interface of the liquid is displaced somewhat toward the nozzles 21N, liquid does not drip from the nozzles 21N.

Liquid Dripping Prevention When Power Supply Is Off

Next, the head replacement work performed in a power OFF state of the liquid discharge apparatus 11 in the second embodiment will be described.

When power supply is OFF, an operator performs an operation having the same content as that of the liquid dripping prevention control by a manual operation. An operator drives the pump 47, the first valve 38, the second valve 40 and the switching mechanism 48 by a manual operation. The first valve 38 and the second valve 40 are normally closed valves, thus are in a closed state when power supply is OFF. Thus, the supply flow path 87 is closed. An operator operates the operation sections 38A, 40A to switch the first valve 38 and the second valve 40 from a closed valve state to an open valve state.

Because of the movement of the liquid discharge head 20 to the replacement position PH2, the water head difference between the liquid at the standard position of the liquid surface of the first reservoir chamber 62 and the second reservoir chamber 68, and the meniscus of the liquid located at the nozzle surface 21A of the liquid discharge head 20 is further increased. A negative pressure applied to the liquid in the nozzles 21N is increased according to the increase of the water head difference. As a result, the meniscus of the liquid in the liquid discharge head 20 is moved in a depth direction (upstream direction) of the nozzles 21N.

Next, an operator depressurizes the first reservoir chamber 62 and the second reservoir chamber 68 by a manual operation. First, an operator uses the operation section 74 to perform a switching operation on the cam of the switching mechanism 48. An operator performs a cam switching operation to select a switching position to open the first selection valve 73*a*, the fifth selection valve 73*e*, the eighth selection valve 73*h*, the 10th selection valve 73*j* and the 11th selection valve 73*k*, and close other selection valves. In this state, an operator operates the operation section 47A to drive the pump 47 in a reverse direction. Thus, the air in the first reservoir chamber 62 is discharged through the coupling flow path 52 and the atmosphere open path 50, and the pressure in the first reservoir chamber 62 decreases. At the same time, the air in the second reservoir chamber 68 is discharged through the coupling flow path 52, and the pressurization flow path 51, and the pressure in the second reservoir chamber 68 decreases.

Because the first reservoir chamber 62 and the second reservoir chamber 68 are depressurized, the negative pressure applied to the liquid at the position of the meniscus of the liquid further increases by the amount of depressurization in the liquid discharge head 20. Therefore, the meniscus of the liquid in the liquid discharge head 20 is moved further upstream. An air area is generated in a portion including the nozzles 21N in the liquid discharge head 20. After driving the pump 47 in a reverse direction for a necessary number of rotations, an operator stops the operation using the operation section 47A. In this manner, the reservoirs 33, 35 are depressurized.

Furthermore, an operator uses the operation section 74 to perform a switching operation on the cam of the switching mechanism 48. An operator performs a cam switching operation to select a switching position to open the first selection valve 73*a*, the fifth selection valve 73*e*, the eighth selection valve 73*h*, the 10th selection valve 73*j* and the 11th selection valve 73*k*. Therefore, the depressurized state of the reservoirs 33, 35 is maintained.

Effects of Second Embodiment

According to the second embodiment, the effects of the above-mentioned (1) to (4) in the first embodiment are obtained in the same manner, and additionally the following effects are obtained.

(8) The liquid discharge apparatus 11 is provided in the middle of the supply flow path 87, and includes the valves 38, 40 that can open and close the supply flow path 87, and the controller 100 that can control the opening and closing of the valves 38, 40. The valves 38, 40 are configured to be manually opened and closed when power supply is OFF. With this configuration, even when the supply flow path 87 is detached from the liquid discharge head 20 in a power OFF state, a negative pressure can be applied to the couplers 89 of the joint 88 by manually opening the valves 38, 40. Thus, when the supply flow path 87 is detached from the liquid discharge head 20, liquid dripping can be prevented.

(9) The liquid discharge apparatus 11 further includes the depressurizer 76 configured to depressurize the space in the reservoir 86, and the depressurization maintainer 77 configured to maintain a depressurized state of the space depressurized by the depressurizer 76. The depressurizer 76 and the depressurization maintainer 77 are configured to be controlled by the controller 100, and configured to be manually operable. With this configuration, when the supply flow path 87 is detached from the liquid discharge head 20, a negative pressure can be applied to the couplers 89 of the joint 88.

This embodiment can be modified and implemented in the following manner. This embodiment and the following modifications can be combined in a technically consistent range and implemented.

- In the first embodiment, the controller 100 may cause the variable capacity mechanism 58 to drive in a direction in which the volume of the liquid chamber 41 increases so that the number of times of drawing liquid into the liquid chamber 41 may be one. In other words, only the process of step S11 may be performed.
- In the first embodiment, a flow path valve that opens and closes the supply flow path 87 may be provided at a position between the liquid chamber 41 of the variable capacity mechanism 58 and the joint 88. When the liquid in the liquid discharge head 20 is drawn upstream (toward the joint 88) by increasing the volume of the liquid chamber 41, the flow path valve may be opened, and when the liquid drawn into the liquid chamber 41 is delivered to the first reservoir chamber 62, the flow path valve may be closed.
- In the first embodiment, when the joint 88 is detached from the female coupler 22 of the liquid discharge head 20, the first valve 38 and the second valve 40 may be in an open state.
- In the first embodiment, as in the second embodiment, the first reservoir chamber 62 and the second reservoir chamber 68 may be depressurized at the time of head replacement. With this configuration, when the joint 88 is detached from the liquid discharge head 20, dripping of liquid from the couplers 89 can be further prevented.
- In the second embodiment and the above-described modifications, only one of the first reservoir chamber 62 and the second reservoir chamber 68 may be depressurized at the time of head replacement.
- In the second embodiment, only one of the first valve 38 and the second valve 40 may be in an open state at the time of head replacement.
- In the second embodiment, each of the first reservoir chamber 62 and the second reservoir chamber 68 may not be depressurized at the time of head replacement.
- The replacement position PH2 of the liquid discharge head 20 may be same as the cap position at which the head 21 is capped by the cap 116. In addition, the liquid discharge head 20 may not be a liftable head that is designed to be moved to a height position at the time of replacement, which is different from the position during printing or in print standby.
- The pumps 47, 75 are not limited to tube pumps, and may be other pumps. For example, the pumps 47, 75 may be diaphragm pumps or gear pumps.
- The liquid supply member 81 is not limited to the one which is disposed in the apparatus body 12 of the liquid discharge apparatus 11, and may be an external one which is coupled to the apparatus body 12 via a tube or the like.
- The latch 91 and the female latch 88A are not necessarily a projecting section and a depressed section, respectively, and may be reversed. Also, for the latch 91 and the female latch 92A, a projecting section and a depressed section may be reversed.
- In the retainer 90, the latch 91 to be latched to the joint 88 and the latch 91 to be latched to the cap 92 may be separately provided.
- The latch 91 may also be a snap-fit latch.
- The joint 88 may not include the female latch 88A. The latch 91 may be configured to have a regulation surface which comes into contact with the lateral surface of the joint 88 to regulate the joint 88 at a retained position.
- The first reservoir 33 or the second reservoir 35 may have a window through which a user can visually recognize an amount of liquid.
- The reservoir 86 may be one reservoir without being divided into the first reservoir 33 and the second reservoir 35.
- The reservoir 86 may be the liquid storage 82. In other words, the first reservoir 33 and the second reservoir 35 may not be provided in the embodiment. The liquid storage 82 attached to the mounting section 83 may be configured to be coupled to the supply flow path 87 as a reservoir.
- At the time of circulation of liquid, liquid from the liquid discharge head 20 may be returned to the second reservoir chamber 68 through the return flow path 39.
- The supply flow path 87 is not limited to a liquid circulation flow path including the delivery flow path 37 and the return flow path 39, and may be a supply flow path 87 including only one flow path for each color corresponding to the delivery flow path 37.
- The liquid storage 82 is not limited to a cartridge such as an ink cartridge, and may be a tank configured to be attachable to and detachable from the mounting section 83. The reservoir 86 may be a tank which is attachable to and detachable from the apparatus body 12, and which is to be filled with liquid by a user.
- The opening 12D through which the liquid discharge head 20 is taken out for replacement may be formed in the lateral section of the apparatus body. For example, the liquid discharge head 20 may be replaced through an opening in the rear surface of the apparatus body 12.
- The arrangement position of the retainer 90 is not limited to an upper position of the mounting section 83, and may be a lateral position of the mounting section 83.
- The liquid discharge apparatus 11 may be a serial printer. In this situation, the serial liquid discharge head 20 has the head 21, and a carriage provided with the head 21 and movable in the width direction X. The joint 88 coupled to one end of the supply flow path 87 is coupled to the female coupler 22 provided in the carriage.
- The liquid discharge apparatus may be an ink jet textile printing apparatus. The textile printing apparatus may include the retainer 90 on which the joint 88 is placed, and may additionally include the cap 92. Furthermore, the textile printing apparatus may perform the liquid dripping prevention control.

The liquid discharge apparatus 11 is not limited to a multifunction printer. The liquid discharge apparatus 11 may not include the image reader 13

The liquid discharge apparatus 11 may be a liquid discharge apparatus that discharges liquid other than ink. Examples of the liquid include pre-treatment liquid and post-treatment liquid for printing. The state of liquid discharged from the liquid discharge apparatus as a tiny amount of droplets also includes a granular state, a tear-shaped state, and a thread-like state. The liquid referred to herein may be a material which can be discharged from the liquid discharge apparatus. For example, the liquid may be in a state where a substance is in a liquid phase, and includes a high or low viscosity fluid, a sol, gel water, and other fluids such as an inorganic solvent, an organic solvent, a solution, a liquid resin, liquid metal, and metal melt. The liquid includes not only liquid as a state of substance, but also solutions obtained by dissolving, dispersing or mixing particles of functional material in a solvent, the particles being comprised of solid substances such as pigments and metal particles.

In the following, the technical idea and its operational effects derived from the embodiment and its modifications will be described.

(A) A liquid discharge apparatus includes: a liquid discharge head configured to discharge liquid; a reservoir provided at a position lower than the liquid discharge head, and configured to store liquid to be supplied to the liquid discharge head; a supply flow path provided with a joint detachable from the liquid discharge head, and configured to communicate with the liquid discharge head and the reservoir; and a retainer configured to retain the joint detached from the liquid discharge head. The joint has a coupler to be coupled to the liquid discharge head, and the retainer is configured to retain the joint with the coupler facing up.

With this configuration, even when the joint of the supply flow path is detached from the liquid discharge head, dripping of liquid from the coupler of the joint can be prevented.

(B) The liquid discharge apparatus may further include a cap detachably provided in the retainer, and configured to be attachable to and detachable from the coupler of the joint detached from the liquid discharge head.

With this configuration, dripping of liquid from the coupler can be further prevented.

(C) In the liquid discharge apparatus, the retainer may be formed in a bottomed box shape with an opening upward.

With this configuration, even when liquid drips from the coupler, adhesion of liquid to other portions can be prevented.

(D) The liquid discharge apparatus may further include a valve provided in a middle of the supply flow path, and configured to open and close the supply flow path; and a controller configured to control opening and closing of the valve. The valve may be configured to be manually opened and closed when power supply is off.

With this configuration, even when the supply flow path is detached from the liquid discharge head in a power OFF state, a negative pressure can be applied to the coupler of the joint by manually opening the valve. Thus, when the supply flow path is detached from the liquid discharge head, liquid dripping can be prevented.

(E) In the liquid discharge apparatus, the valve may be a normally closed valve that automatically closes the supply flow path when power supply is off.

With this configuration, continuous dripping of liquid from the nozzles due to an unexpected situation at the time of power OFF can be prevented.

(F) The liquid discharge apparatus may further include a depressurizer configured to depressurize space in the reservoir; and a depressurization maintainer configured to maintain a depressurized state of the space depressurized by the depressurizer. The depressurizer and the depressurization maintainer may be configured to be controlled by the controller, and to be manually operable.

With this configuration, when the supply flow path is detached from the liquid discharge head, a negative pressure can be applied to the coupler of the joint.

(G) The liquid discharge apparatus may further include a drive unit. The supply flow path may include a flexible section having flexibility in at least part of the supply flow path, the drive unit may be configured to displace the flexible section in a direction in which a capacity of the supply flow path increases, and to maintain a state of the displaced flexible section, and the drive unit may be configured to be controlled by the controller, and to be manually operable.

With this configuration, when the supply flow path is detached from the liquid discharge head, a negative pressure can be further applied to the coupler of the joint.

(H) The liquid discharge apparatus may further include a mounting section detachably provided with a liquid storage that stores liquid to be supplied to the reservoir. The liquid discharge head may have a female coupler configured to be coupled to the coupler of the joint, and the retainer may be provided at a position closer to a base end of the supply flow path than the female coupler of the liquid discharge head, the base end being one end of the supply flow path and near the reservoir.

With this configuration, the joint detached from the liquid discharge head is easily retained by the retainer. For example, when an operator places the detached joint on the retainer, a load due to tension, fracture, or torsion is unlikely to be applied to the supply flow path.

What is claimed is:

1. A liquid discharge apparatus comprising:

a liquid discharge head configured to discharge liquid;

a reservoir provided at a position lower than the liquid discharge head, and configured to store liquid to be supplied to the liquid discharge head;

a supply flow path provided with a joint detachable from the liquid discharge head, and configured to communicate with the liquid discharge head and the reservoir; and a retainer configured to retain the joint detached from the liquid discharge head, wherein the joint has a coupler to be coupled to the liquid discharge head, the retainer is configured to retain the joint with the coupler facing up, and a cap is detachably provided in the retainer, and configured to be attachable to and detachable from the coupler of the joint detached from the liquid discharge head.

2. The liquid discharge apparatus according to claim 1, wherein the retainer is formed in a bottomed box shape with an opening upward.

3. The liquid discharge apparatus according to claim 1, further comprising:

a valve provided in a middle of the supply flow path, and configured to open and close the supply flow path; and a controller configured to control opening and closing of the valve, wherein the valve is configured to be manually opened and closed when power supply is off.

4. The liquid discharge apparatus according to claim 3, wherein the valve is a normally closed valve that automatically closes the supply flow path when power supply is off.

5. The liquid discharge apparatus according to claim 3, further comprising:

a depressurizer configured to depressurize space in the reservoir; and a depressurization maintainer configured to maintain a depressurized state of the space depressurized by the depressurizer, wherein the depressurizer and the depressurization maintainer are configured to be controlled by the controller, and to be manually operable.

6. The liquid discharge apparatus according to claim 3, further comprising a drive unit, wherein the supply flow path includes a flexible section having flexibility in at least part of the supply flow path, the drive unit is configured to displace the flexible section in a direction in which a capacity of the supply flow path increases, and to maintain a state of the displaced flexible section, and the drive unit is configured to be controlled by the controller, and to be manually operable.

7. The liquid discharge apparatus according to claim 1, further comprising a mounting section detachably provided with a liquid storage that stores liquid to be supplied to the reservoir, wherein the liquid discharge head has a female coupler configured to be coupled to the coupler of the joint, and the retainer is provided at a position closer to a base end of the supply flow path than the female coupler of the liquid discharge head, the base end being one end of the supply flow path and near the reservoir.

8. A liquid discharge apparatus comprising:

a liquid discharge head configured to discharge liquid;

a reservoir provided at a position lower than the liquid discharge head, and configured to store liquid to be supplied to the liquid discharge head;

a supply flow path provided with a joint detachable from the liquid discharge head, and configured to communicate with the liquid discharge head and the reservoir;

a retainer configured to retain the joint detached from the liquid discharge head;

a valve provided in a middle of the supply flow path, and configured to open and close the supply flow path; and a controller configured to control opening and closing of the valve, wherein the joint has a coupler to be coupled to the liquid discharge head, the retainer is configured to retain the joint with the coupler facing up, and the valve is configured to be manually opened and closed when power supply is off.

9. The liquid discharge apparatus according to claim 8, wherein the valve is a normally closed valve that automatically closes the supply flow path when power supply is off.

10. The liquid discharge apparatus according to claim 8, further comprising:

a depressurizer configured to depressurize space in the reservoir; and a depressurization maintainer configured to maintain a depressurized state of the space depressurized by the depressurizer, wherein the depressurizer and the depressurization maintainer are configured to be controlled by the controller, and to be manually operable.

11. The liquid discharge apparatus according to claim 8, further comprising a drive unit, wherein the supply flow path includes a flexible section having flexibility in at least part of the supply flow path, the drive unit is configured to displace the flexible section in a direction in which a capacity of the supply flow path increases, and to maintain a state of the displaced flexible section, and the drive unit is configured to be controlled by the controller, and to be manually operable.

12. A liquid discharge apparatus comprising:

a liquid discharge head configured to discharge liquid;

a reservoir provided at a position lower than the liquid discharge head, and configured to store liquid to be supplied to the liquid discharge head;

a supply flow path provided with a joint detachable from the liquid discharge head, and configured to communicate with the liquid discharge head and the reservoir;

a retainer configured to retain the joint detached from the liquid discharge head; and a mounting section detachably provided with a liquid storage that stores liquid to be supplied to the reservoir, wherein the joint has a coupler to be coupled to the liquid discharge head, the retainer is configured to retain the joint with the coupler facing up, the liquid discharge head has a female coupler configured to be coupled to the coupler of the joint, and the retainer is provided at a position closer to a base end of the supply flow path than the female coupler of the liquid discharge head, the base end being one end of the supply flow path and near the reservoir.

* * * * *